United States Patent
Sturza et al.

(10) Patent No.: US 6,665,296 B1
(45) Date of Patent: Dec. 16, 2003

(54) NETWORK ACCESS COMMUNICATION SYSTEM

(75) Inventors: Mark A. Sturza, Encino, CA (US); Moshe L. Liron, Palo Alto, CA (US)

(73) Assignee: Social Fabric Corporation, West Covina, CA (US)

( * ) Notice: Subject to any disclaimer, the term of this patent is extended or adjusted under 35 U.S.C. 154(b) by 0 days.

(21) Appl. No.: 09/457,806

(22) Filed: Dec. 9, 1999

(51) Int. Cl.[7] .............................................. H04L 12/28
(52) U.S. Cl. ...................................... 370/389; 370/465
(58) Field of Search ................................ 370/310, 352, 370/353, 380, 389, 392, 401, 404, 427, 435, 456, 465, 485; 379/88.13; 707/10

(56) References Cited

U.S. PATENT DOCUMENTS

| | | | |
|---|---|---|---|
| 2,288,802 A | 7/1942 | Hammond | |
| 4,525,861 A | 6/1985 | Freeburg | |
| 4,528,656 A | 7/1985 | Morais | |
| 4,633,463 A | 12/1986 | Mack | |
| 4,704,733 A | 11/1987 | Kawano | |
| 4,747,160 A | 5/1988 | Bossard | |
| 4,785,450 A | 11/1988 | Bolgiano | |
| 5,960,074 A * | 9/1999 | Clark | 370/389 |
| 6,445,777 B1 * | 9/2002 | Clark | 379/88.13 |
| 6,446,070 B1 * | 9/2002 | Arnold et al. | 707/10 |

FOREIGN PATENT DOCUMENTS

| | | |
|---|---|---|
| DE | 2 659 638 B1 | 5/1978 |
| EP | 0179612 A2 | 4/1985 |
| EP | 0201254 A2 | 11/1986 |
| EP | 0361299 A2 | 4/1990 |
| EP | 0 918 417 | 10/1998 |
| FR | 1 024 523 | 4/1953 |
| GB | 1 586 260 | 3/1981 |
| GB | 2 261 575 A | 5/1993 |
| WO | WO 91/06162 | 5/1991 |
| WO | WO 95/23935 | 5/1992 |
| WO | WO 97/12456 | 4/1997 |

OTHER PUBLICATIONS

FCC 99–183, Table 1:Existing Allocation(in Gigahertz spectrum, Jul. 23, 1999.*

(List continued on next page.)

Primary Examiner—Salvatore Cangialosi
(74) Attorney, Agent, or Firm—Thomas N. Giaccherini

(57) ABSTRACT

A communication system (10) is disclosed which provides two-way communications access to a wide area network (WAN)(11) for a very large number of subscribers (17). It offers an inexpensive "last-mile" hookup from a subscriber terminal (15) to a communications hub (12). The hub (12) is connected to a WAN (11) such as the Internet. The system comprises service areas (14), 0.7 to 1.5 km radius (18), wherein the hub (12) and subscribers (17) are located. Subscribers (17) are connected to a subscriber terminal (15), directly or through a local area network (LAN)(39). Each terminal (15) communicates with the hub by a SHF radio link (13). Distributed routing of signals provides subscribers (17) with no-waiting, transmission of information at speeds about ten Mbps. Availability of a communication path approximates a fiber optic cable. The LAN (39) may be a local public switched telephone network. Each service area (14) is divided into one to forty sectors (16). Eight sectors (16) can support approximately 1,600 subscribers (17). Service areas (14) may be arranged to cover larger areas. Overlapping service areas (14) permit subscribers (17) to be within line-of-sight of a hub (12). Service area arrangement is readily adapted to terrain, existing structure and number of subscribers (17).

35 Claims, 13 Drawing Sheets

OTHER PUBLICATIONS

FCC Xerox Telecommunications Network (XTEN) & Petition for Rulemaking pp. 1–39 (11/78).

Jacobs– Low Power Television (6/82).

Silverman–Digital Termination System . . . . (1/83) Microwave Jornal, vol. 26, No. 1 p. 81.

Cooper & Nettleton–Cellular Mobile Technology: IEEE Spectrum the Great Multiplier (6/83).

Murakami– et al Multiple Access DigitalMicrowave . . . of Lacal Subscribers, (6/83).

Urich & Bohm–"Digital Termination Systems", Computer world (6/84) pp. 35–38.

Hardy & Lemp–"New Autoplex Cell Site . . . Digital Cellular Com." (5/90).

Xerox Comments on DTS Notice of Proposed Rulemaking, FCC Filing (1/80) pp. 1–35.

Mibelich, "Mitchell Commits to Cellular TV Study", (2/91) Private Cable pp. 28, 29, 31.

"Link Aggregation an Trunking IEEE 802 LMSC Tutorial" et al Frazier et al (11/97).

* cited by examiner

| | Sub to Hub | | Hub to Sub | |
|---|---|---|---|---|
| Peak Transmit Power (dBW) | -27.0 | | -13.0 | |
| Peak Transmit Power (mW) | | 2 | | 50 |
| Feed Loss (dB) | 1.0 | | 1.0 | |
| Transmit Antenna Peak Gain (dB) | 37.9 | | 24.0 | |
| Half-Power Beamwidth (deg) | | 2.3 | | |
| Efficiency | | 0.70 | | |
| Effective Diameter (m) | | 0.15 | | |
| Pointing Loss (dB) | 3.0 | | 3.0 | |
| EIRP (dBW) | 6.9 | | 7.0 | |
| | | | | |
| Free Space Loss (dB) | 127.6 | | 127.6 | |
| Frequency (GHz) | | 60 | | 60 |
| Path Length (Km) | | 0.96 | | 0.96 |
| Polarization Loss (dB) | 0.00 | | 0.00 | |
| Gaseous Loss (dB) | 14.3 | | 14.3 | |
| Rain Loss@99.7% Rain Availability | 1.8 | | 1.8 | |
| Total Transmission Loss (dB) | 143.8 | | 143.8 | |
| | | | | |
| Receive Antenna Peak Gain (dB) | 24.0 | | 37.9 | |
| Half-Power Beamwidth (deg) | | | | 2.3 |
| Efficiency | | | | 0.70 |
| Effective Diameter (m) | | | | 0.15 |
| Polarization Mismatch Loss (db) | 0.2 | | 0.2 | |
| Transmit Ant Axial Ratio (dB) | | 2.0 | | 2.0 |
| Receive Ant Axial Ratio (dB) | | 2.0 | | 2.0 |
| Pointing Loss (dB) | 3.0 | | 3.0 | |
| Systems Noise Temp @ Antenna (dB-°K) | 30.5 | | 30.5 | |
| Feed Loss (dB) | | 1.0 | | 1.0 |
| Receiver Noise Figure (dB) | | 5.0 | | 5.0 |
| Antenna Temperature (°K) | | 268 | | 268 |
| Receiver/Feed Noise Temp (°K) | | 865 | | 865 |
| System Noise Temp @ Ant (°K) | | 1133 | | 1133 |
| G/T (dB/°K) | -9.8 | | 4.2 | |
| | | | | |
| Information Rate (dB-Mbps) | 73.0 | | 86.0 | |
| Information Rate (Mbps) | | 20 | | 400 |
| Required Eb/No (dB) | 4.0 | | 4.0 | |
| Implementation Loss (dB) | 2.0 | | 2.0 | |
| Required C/No (dB-Hz) | 79.0 | | 92.0 | |
| | | | | |
| Unallocated Margin (dB) | 3.0 | | 4.0 | |

Fig. 6

NETWORK ACCESS COMMUNICATION SYSTEM

FEDERALLY SPONSORED RESEARCH OR DEVELOPMENT

Not Applicable.

FIELD OF THE INVENTION

The present invention relates to the field of communication systems. More particularly, this invention comprises methods and apparatus for providing many individual customers with symmetric access to a broad-band, wide-area network, especially where capable telecommunications infrastructure is non-existent or very expensive to install.

BACKGROUND OF THE INVENTION

In the past few years, a new information revolution has caused the demand for communications to skyrocket. The emergence of the Internet as a new distribution and business medium, coupled with the continuing improvements in computing speed and power, have strained the ability of conventional networks to meet this burgeoning demand.

The installed base of conventional copper wires present inherent limitations and constraints to providing enhanced levels of communications services. Although new compression and signal processing techniques have enabled telephone companies to offer faster speeds and greater bandwidth using new services such as ISDN, DSL and ADSL, the market demand for more capacity will soon outpace these recent innovations. The use of optical fiber and cable television networks for new modes of communication is increasing, but fibers and cables have their own drawbacks and are relatively expensive to install and to maintain. Several satellite systems, including Teledesic™, Iridium™ and Globalstar™, are planning to offer world-wide high-speed services, but most of these companies will not roll out their full panoply of services for several years.

Each of these technologies supplies part of a solution to the problem of offering an improved global network, but none of them have yet conquered the holy grail of the telecommunications industry, the "last mile" of service. The most expensive segment of furnishing service to a customer is usually the last mile of the connection to the customer's location.

Several attempts to solve the problem of distributing information to large numbers of subscribers have met with mixed results. A number of these attempts are summarized below.

U.S. Pat. No. 2,288,802 issued to John Hays Hammond in 1942 and entitled Signaling System discloses a radio transmission system which employs a carrier wave that is transmitted in two substantially independent channels. The channels are "made independent" by using polarizations which propagate at right angles to each other. The carrier waves may also be modulated "by the same signal frequency, but with a predetermined phase relationship between the two modulations." See Hammond, Column 1, Lines 1–24.

U.S. Pat. No. 4,747,160, issued to Bernard Bossard on May 24, 1988 and entitled Low Power Multi-Function Cellular Television System describes a network of low power, substantially omni-directional cell node transmitters which communicate with a directional receiving antennas. Bossard's omni-directional transmitter imposes severe constraints on the ability of this system to provide diverse information services to many different customers.

One particular disadvantage of Bossard's system, which is due to its omni-directional signal, is the limitation of the system to compensate for rainfall in small portions of customer cells. Since the entire signal must be amplified at an omni-directional broadcast node, the system runs the risk of overpowering the signal to customers which are unaffected by the storm fronts. Bossard compensates for this constraint by limiting cell size.

Another severe limitation of the Bossard invention is the inability of the Bossard system to transmit to a single customer, or to transmit different signals to many different customers. The cell size in Bossard's system is also limited to the amount of power generated, which is dependent on the available (TWT) of about 100 watts. The base case for Bossard's system might be a quadratic cell for a "substantially" omni-directional system, in which a 100 watt TWT might be located in each of four quadrants of a broadcast cell, limiting the cell broadcast power to approximately 400 watts.

In 1977, Xerox Corporation initiated work on the Xerox Telecommunications Network (XTEN), a nationwide, high-speed, end-to-end, digital communications service. XTEN was designed to provide local data services using a combination of substantially omni-directional transmission from cell nodes and point-to-point return links from transceivers located at business premises. Local networks were to be connected by intercity satellite or terrestrial "backbone" facilities. See *Xerox Petition for Rulemaking*, filed with the Federal Communications Commission on Nov. 16, 1978. See also Xerox Comments on the DTS Notice of Proposed Rulemaking, filed with the Federal Communications Commission on Jan. 14, 1980.

Siemens Corporation received U.S. Pat. No. 1,586,260 from the Federal Republic of Germany in 1977. This patent, entitled A Radio Telecommunications System, discusses a system which connects stationary subscriber stations to a telecommunications network such as a public telephone network. A radio concentrator, assigned to a dial-operated exchange, is connected to the stationary subscribers via an omni-directional antenna. See Siemens '260, Column 1, Lines 9–13 and Lines 21–24.

Siemens was also awarded French Patent No. 1,024,523 entitled Réseau d'émetteurs d'ondes Ultra-courtes, which also pertains to transmission of radio and television programs. See Siemens '523, Resumé, Column 4.

In June of 1982, George Jacobs published a paper entitled *Low Power Television* in IEEE Spectrum. Jacobs explains the impact of the development of short-range, low-cost television systems. FIG. 3 of his article reveals the components of a low-power television station designed to produce electromagnetic power of a kilowatt or less.

Donald Silverman offers an analysis of an integrated, end-to-end digital communications service which may be used to augment existing inter-city network facilities in his paper entitled *The Digital Termination System Solution for High Speed Local Distribution*. This paper was published in the January, 1983 edition of Microwave Journal.

The IEEE Spectrum published a paper in June, 1983 by George Cooper and Ray Nettleton entitled *Cellular Mobile Technology. The Great Multiplier*. This article discusses the advantages of a cellular mobile communications system, interference problems, narrowband modulation, digital transmission, space diversity techniques which reduce fading and spread-spectrum and frequency hopping methods.

In their paper entitled *Multiple Access Digital Microwave Radio System for Local Subscribers*, Nasatoshi Murakami et al. describe a radio communication system which provides point-to-multipoint digital transmission in a metropolitan area. See IEEE International Conference on Communications '83, June 1983, pp. b2.5.1.

In an article entitled *Digital Termination Systems*, Walter Urich and Ronald Bohm describe a common carrier service designed to provide flexible, low-cost digital communications within a community using a portion of the microwave spectrum. See Computerworld, Jun. 6, 1984, pages 35–38.

In U.S. Pat. No. 4,525,861 issued in 1985, Thomas Freeburg explains the details of his *Zoned Data Communications System for Communicating Message Signals between Portable Radios and a Host Computer*. This system serves a geographic area that is divided into a number of non-overlapping zones. Signals carrying alphanumeric information are conveyed among a general communications controller and a number of portable radios. See Freeburg, Abstract, Lines 1–9.

Douglas Morais describes a Radio Communication System Using Frequency Division Multiplexing for Transmission between a Master Station and a Plurality of Remote Stations in his U.S. Pat. No. 4,528,656, printed in 1985. Morais' point-to-multipoint radio communication system includes a master station and a number of remote stations which communicate using frequency division multiplexing.

Alfred Mack discusses his Radio Communication System in his U.S. Pat. No. 4,633,463, granted in 1986. Mack's invention pertains to tactical military applications, and includes at least one remote station associated with each of several central stations. Each central station is connected to an omni-directional antenna, while each remote station is connected to a directional antenna. Each central station transmits at a distinct frequency, and each remote station is tuned to receive only the one frequency which is transmitted by its associated central station. See Mack, Abstract, Lines 1–11.

Minoru Kawano was granted U.S. Pat. No. 4,704,733 for his Cell Enhancer for Cellular Radio Telephone System Having Diversity Function in 1987. His invention concerns a cell enhancer for use by one cellular provider in a cellular radio-telephone system. This cell enhancer has an "upstream" antenna system directed at the cell site for receiving the transmitted down-link signal from the cell site. See Kawano, Abstract, Lines 1–10 and Column 2, Lines 38–42.

John R. Mihelich published a paper entitled *Mitchell Commits to Cellular Television Study* in the February, 1991 edition of Private Cable. Mihelich discusses the prospects for universal multi-channel cellular television service.

Siemens holds German Patent No. 2659638, which is entitled "Funksystem zum Anschlußortsfester Teilnehmerstationen an ein Nachrichtennetz.

European Patent Application No. 86303185.2, by Acampora et al., describes a terrestrial radio system which utilizes spot beam time division multiple access and frequency re-use to provide communication services from a base station to remote customer within a system service region.

PCT Patent Application No. PCT/SE90/00681, by Ahl et al., describes a method and a communications system for local dynamically connectable digital synchronous multiplex service networks.

PCT Patent Application No. PCT/DE93/00382, by Ritter et al., describes a mobile radio network with central cell beaming.

U.S. Pat. No. 4,785,450, by Bolgiano et al., describes a communication system that comprises a plurality of subscriber stations in RF communication with a base station having multiple sequentially repetitive time slots.

In the article entitled *New AUTOPLEX Cell Site Paves The Way For Digital Cellular Communications*, Hardy and Lemp describe a cell site that has distributed rather than centralized control.

European Patent Application No. 85307456.5, by Horne, describes a cryptographic system for a direct broadcast satellite network.

Ascom Zelcom AG has filed European Patent Application No. 89117388.2, which is entitled Digitales Funk übertragungssystem für ein aus Zellen aufgebautes Netz unter Verwendung der Bandspreiztechnik.

UK Patent Application No. GB 2 261 575 A, by Marsh et al., describes a method of establishing a telecommunications network between subscriber stations and their associated local station. The network is managed using a system controller.

The problem of overcoming the relatively high cost of offering high-speed and high-bandwidth services to many different kinds of customers over the "last mile" of the global network has presented a major challenge to the telecommunications industry. The development of an intelligent and versatile local, multiple-point distribution system would constitute a major technological advance and would satisfy a long felt need in the telephone, entertainment and information businesses.

SUMMARY OF THE INVENTION

The present invention provides symmetric communications access to a wide area network (WAN) for a very large number of users who send information to and receive information from the network. The invention offers an inexpensive "last-mile" hookup to a very large number of subscribers which can be implemented particularly where a high data-rate capable telecommunications infrastructure does not exist. The use of copper telephone wires, commonly called twisted pairs, to carry information signals is possible at low data rates, but at high data rates, these wires cannot carry information signals over much distance because of losses. Low loss conductors such as coaxial cable or optical fibers are expensive in themselves, and the cost of stringing or burying these cables to bring them to an individual subscriber is usually prohibitively expensive, particularly in densely settled urban communities.

One of the preferred embodiments of the Network Access Communication System combines features of a local area network (LAN) infrastructure with the high data-rate capabilities of microwave or millimeter wave transmissions from a subscriber terminal to a central communications hub. Distributed routing of the information signals provides subscribers with low latency (no-waiting) symmetric transmission of information signals at speeds of about ten million bits per second (10-Mbps). Availability of a communication path in this system approximates that of a fiber optic cable, from 99.7 to 99.9% of time. The system has a low bit error rate (approximately one bit in $10^{-8}$ bits) and a high frequency re-use factor. Among the information exchange protocols the system supports is the transmission control protocol, Internet protocol (TCP/IP) suite.

One of the preferred embodiments of the Network Access Communication System comprises a plurality of service areas in which subscribers are located. Each service area has a communications hub which is connected to a wide area network such as the Internet. Each subscriber is connected to a subscriber terminal, either directly or through a local area network (LAN) serving many other subscribers. In one embodiment, the interface to the local area network operates full duplex on the Ethernet 10BaseT standard. The LAN may be operated by or through a local public switched telephone network (PSTN). Each subscriber terminal is coupled to a communications hub by a radio link operating at frequencies in the microwave or millimeter wave bands. A preferred frequency band is 59–64 GHz, but other bands from 3 GHz to 300 GHz can be used. At these frequencies subscriber terminal antennas are very small, about six inches diameter or less.

Each service area is divided into sectors. The number of sectors may vary depending on the density of subscribers. A sector can efficiently support approximately 200 subscribers. One to forty sectors per service area are preferred. One embodiment of the invention has a service area with eight sectors. An eight sector service area can therefore efficiently support approximately 1,600 subscribers. One or more subscribers generally will be connected to a local area network. Typically, the communications hub is centered in the service area. A service area may have a radius of approximately 0.7 to 1.5 kilometers (km), yielding a coverage area of 1.5 to 7 km. Service areas may be abutted or overlapped to cover larger included areas. Other arrangements are possible, including overlapping the service areas so that individual subscribers will be within line-of-sight of a communications hub. The arrangement of service areas can be readily adapted to the terrain, the existing infrastructure and the number of subscribers contemplated.

Packets of information are transported by the system from a subscriber and routed to a network service provider connected to the WAN. The router functions are distributed between the communications hub and one or more subscriber terminals. A multi-port router delivers the packets to and from the communications hub and the WAN. A two-port router delivers the packets to and from a subscriber terminal to connected subscribers using the LAN.

The communications hub comprises a network unit (NU) and a radio unit (RU). The radio unit has a transceiver and multiplexer/demultiplexer unit. The network unit contains a multi-port router which is coupled to a wide area network (WAN) port. The transceiver transmits to and receives signals from the subscriber terminals in the sectors of the service area. Atmospheric oxygen absorption of these signals is such that low-power, subscriber terminal transmitters, not requiring licenses by the Federal Communications Commission, can operate successfully over a distance of one to two kilometers, the radius of a service area. The multiplexer/demultiplexer unit receives and multiplexes subscriber message traffic onto 100BaseT ports and forwards this traffic to the multi-port router. The message traffic is then passed to the WAN port for transmission to a wide area network service provider, for example, an Internet service provider (ISP).

The subscribers and the subscriber terminal share a single LAN, for example, a 10BaseT Ethernet™. The subscriber terminal comprises a transceiver and a two-ported router connected by a serial interface. The two-port router serves as the subscribers gateway to the network. Local subscriber-to-subscriber intranet communication takes place over the LAN. A subscriber communication to the wide area network proceeds to the subscriber terminal. The signals then pass through the two-port router, a transceiver and a radio link to the communications hub where they are processed as described above. Other routed or switched LAN structures are possible. In the simplest case, a single subscriber is connected directly to a subscriber terminal 10BaseT port. Individual residential subscribers having a single personal computer are most likely to be connected this way. Signals returning from the WAN follow the reverse path to the subscriber.

To avoid interference between subscribers and to provide very high speed information transfer to the large number of users contemplated, the radio communication link in one embodiment incorporates time division duplex (TDD), multi-frequency, time division multiple access (MF-TDMA), channel hopping, sixteen-frequency shift keying (16-FSK) modulation and concatenated coding features Other alternatives to TDD include frequency division duplex (FDD), code division duplex (CDD) and polarization division duplex (PDD). Other usable multiple access techniques include time division (TDMA), frequency division (FDMA), code division (CDMA), polarization division (PDMA), multi-frequency CDMA, multi-frequency PDMA and combinations ofthese. Modulation techniques include binary FSK, M-ary FSK, where M=3, 4 . . . 100, or more and M-ary versions of phase shift keying (PSK). Other usable modulation techniques include M-ary versions of amplitude shift keying (ASK), quadrature amplitude modulation (QAM), pulse position modulation (PPM), Gaussian minimum shift keying (GMSK), continuous phase frequency shift keying (CPFSK), vestigial sideband (VSB) and continuous phase modulation. As before, M=2, 3, 4 . . . 100, or more. Alternative coding schemes include block codes, convolutional codes, turbo codes, turbo block codes and combinations thereof.

In one embodiment, the 59 to 64 GHz radio frequency band is divided into twelve sub-bands of 416.7 MHz each. For communication hubs with from one to twelve sectors, each sector is assigned to a different frequency sub-band. For hubs with from twelve to twenty four sectors, the sub-bands are used up to two times per hub. For hubs with from 25 to 36 sectors, the sub-bands are used up to three times per hub, and for 37 to 48 sectors, they are used up to four times.

In one embodiment of system, which operates in a time division duplex (TDD) mode, a novel radio-frequency circuit is used which acts as a receiver front end or a transmitter final stage depending only on the switching of the signal path between components. It is an elegant solution to the implementation of a high-speed, symmetric-path, radio signal between a subscriber terminal and a WAN. Switching times of about one millisecond permit flow of information in either direction over the SHF radio links between subscriber terminals and communications hub. The circuit comprises an amplifier, a filter, a frequency mixer and four switches. The circuit can be operated at any frequency band from direct current (dc) to light. In the case of the instant invention, it is operated at SHF. When switched to operate as a receiver front end, the circuit performs a low-noise down conversion from radio frequency (RF) to an intermediate frequency (IF). When switched to operate as a transmitter final stage, the circuit performs an up-conversion from IF to RF and a final amplification.

An appreciation of other aims and objectives of the present invention and a more complete and comprehensive understanding of this invention may be achieved by studying the following description of a preferred and alternative embodiments, and by referring to the accompanying drawings.

A BRIEF DESCRIPTION OF THE DRAWINGS

Figure 5:
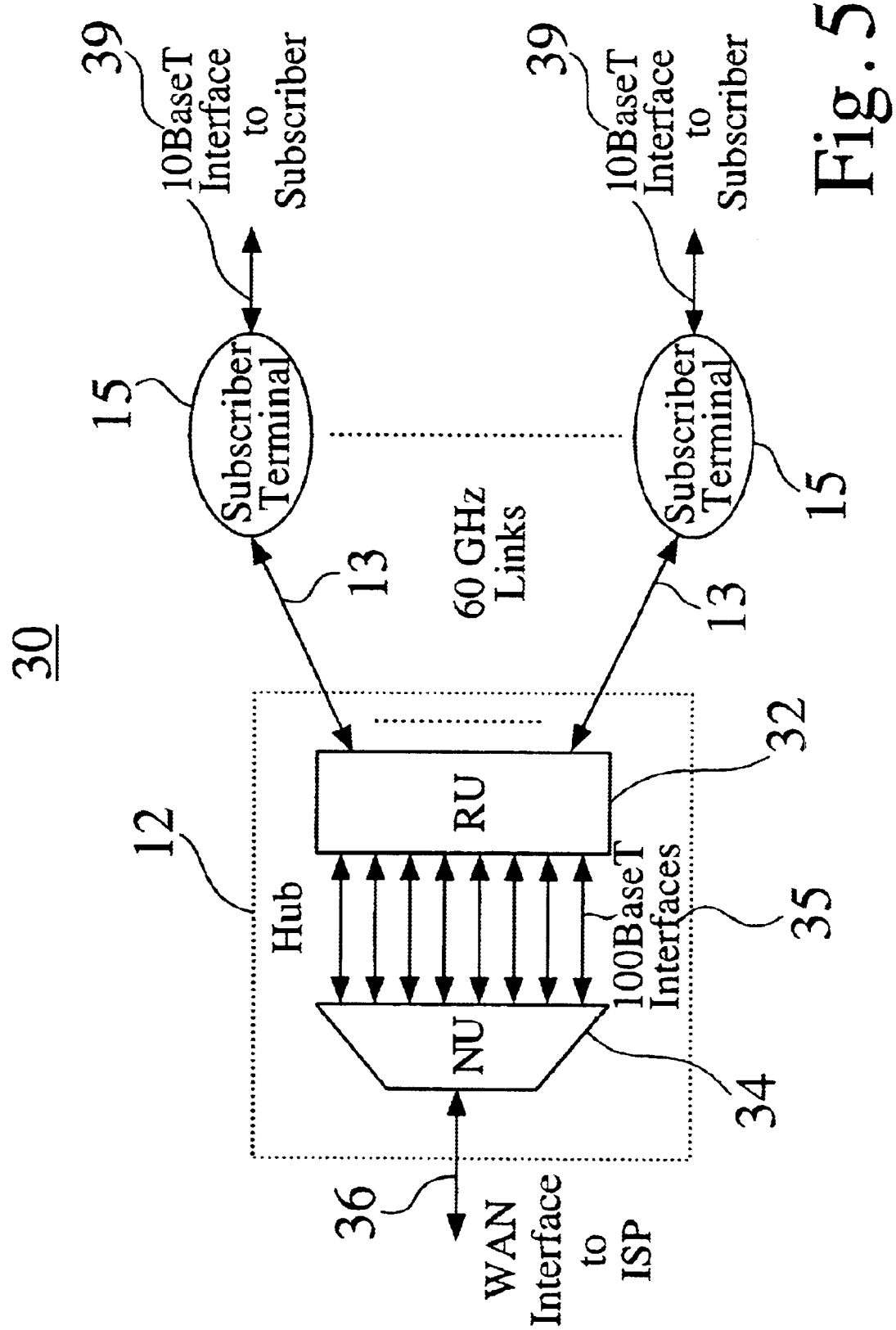

FIG. 5 presents in schematic form, a diagram of signal flow to and from subscriber terminals accessing a communications hub, revealing the network unit (NU) and the radio unit (RU) comprising the hub.

Figure 5A:
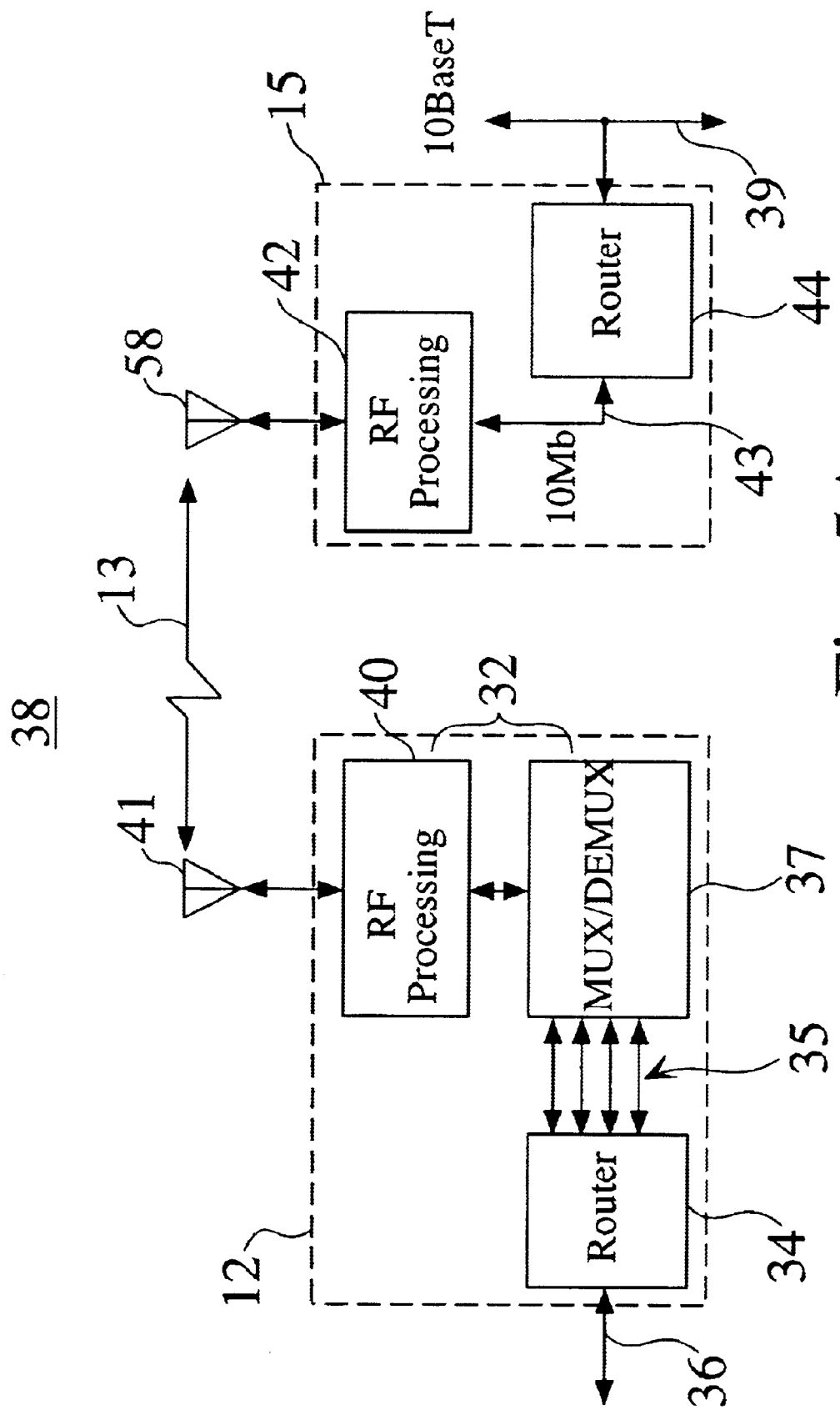

FIG. 5A is a functional block diagram of a network communications hub and a subscriber terminal, showing the router functions distributed to the hub and subscriber terminal.

FIG. 6 presents a table of communication link budgets for a 60 GHz radio link used for communications between a communications hub and a subscriber terminal.

Figure 7:
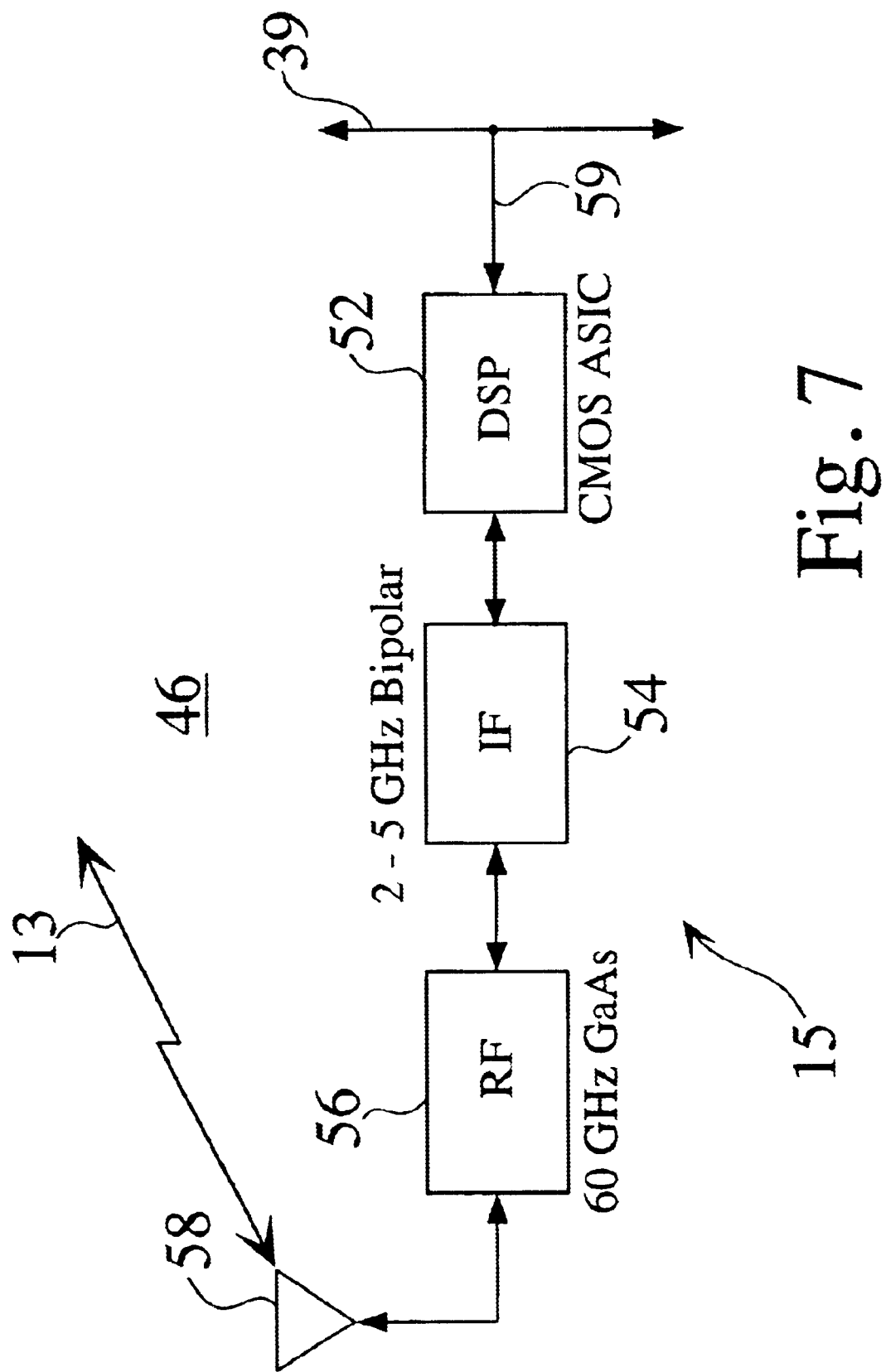

FIG. 7 is a top level functional block diagram of a subscriber terminal.

Figure 8:
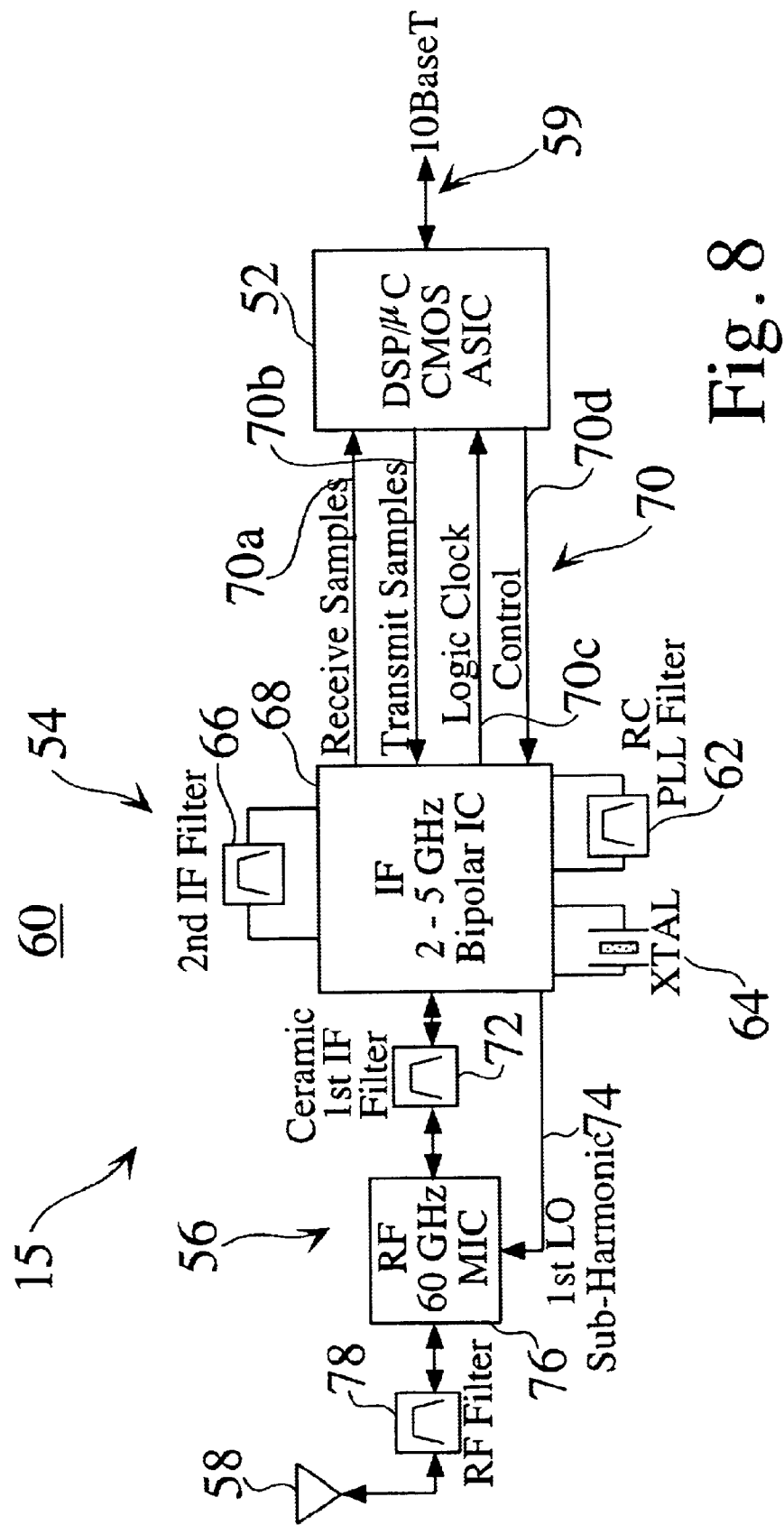

FIG. 8 shows a detailed functional block diagram of a subscriber terminal. The figure includes an ASIC modem and an intermediate frequency (IF) ASIC.

Figure 9:
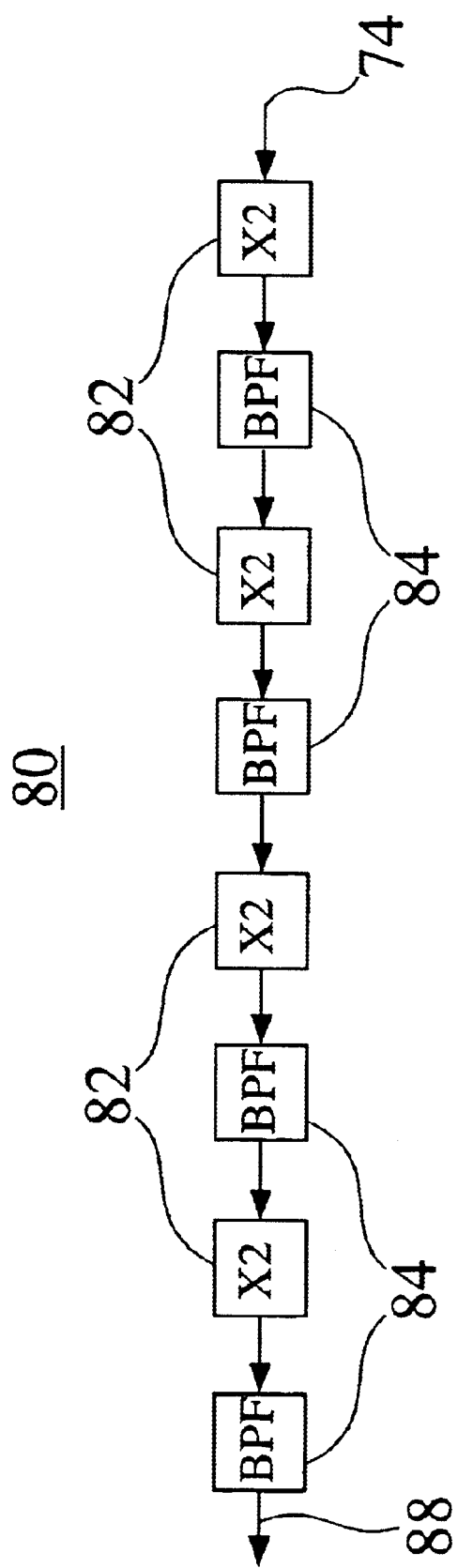

FIG. 9 is a block diagram of a portion of the frequency multiplier used to form a local oscillator (LO) signal from a sub-harmonic frequency generated in the IF ASIC of FIG. 8. The LO signal is provided to a radio frequency microwave integrated circuit (MIC) mixer.

Figure 10:
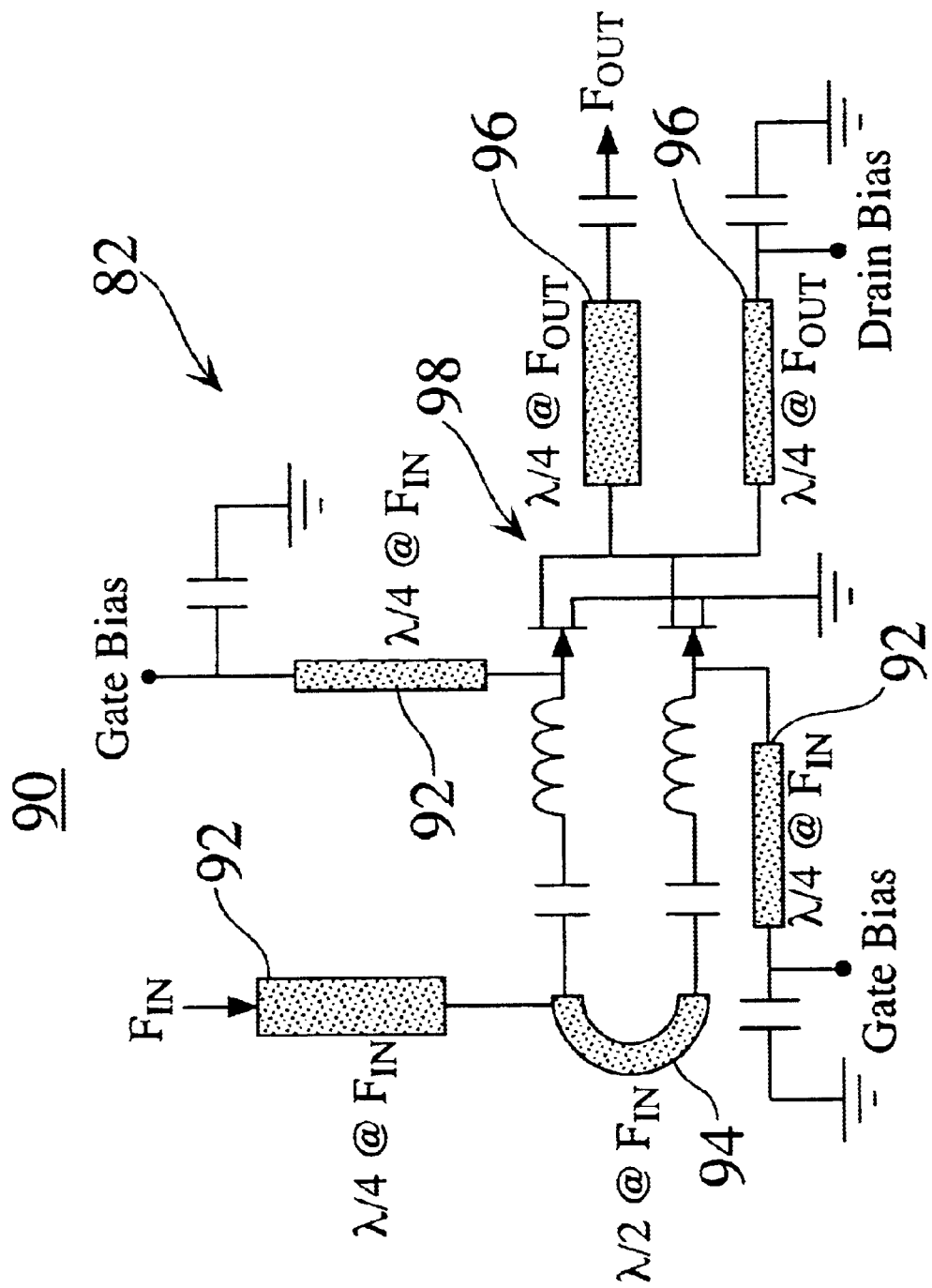

FIG. 10 reveals a schematic diagram of a balanced active doubler used in the frequency multiplier circuits of FIG. 9.

Figure 11:
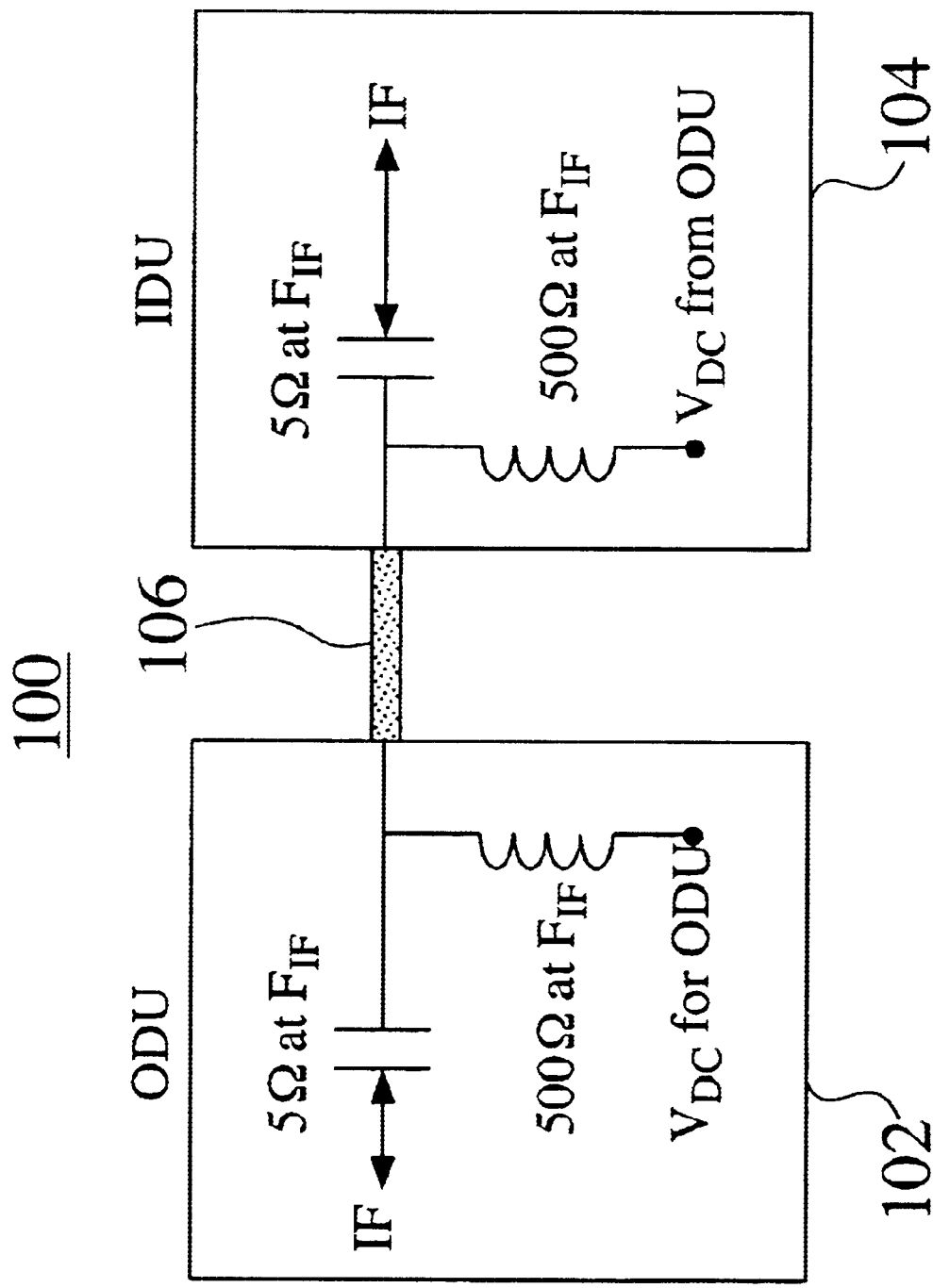

FIG. 11 presents a schematic diagram of a portion of the subscriber terminal, operating at an intermediate frequency (IF) which is separated into an indoor unit (IDU) and an outdoor unit (ODU), connected by coaxial cable.

Figure 12:
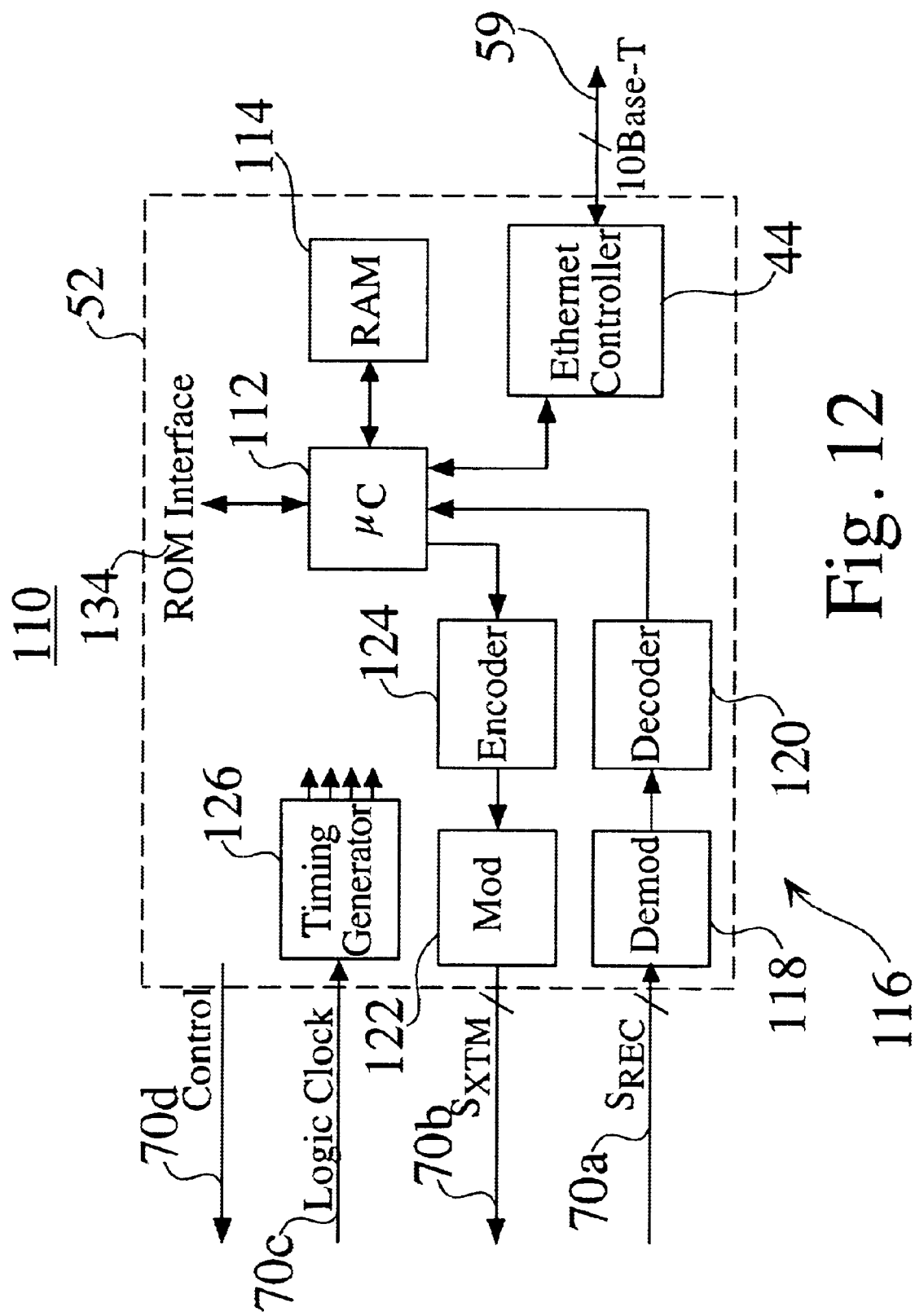

FIG. 12 reveals a functional block diagram of an application specific integrated circuit (ASIC) used for digital processing of signals (DSP) which modulate and demodulate the radio frequency transmissions between a subscriber terminal and a communications hub.

Figure 13:
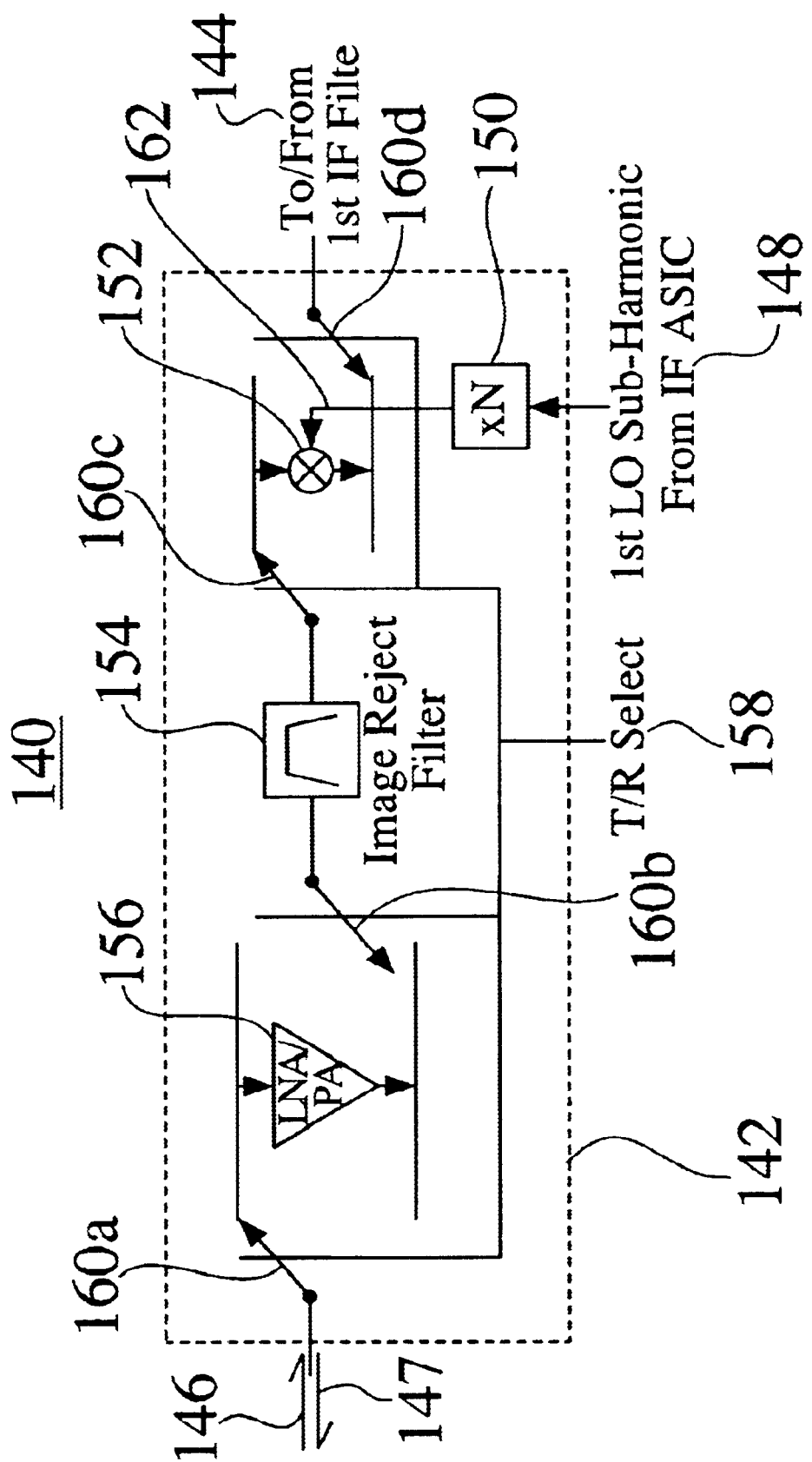

FIG. 13 is a schematic diagram of a transmit/receive module used in a time division duplex operation mode as both a first receiver stage and a final transmitter stage for signals communicated both ways over the Network Access Communication System.

A DETAILED DESCRIPTION OF PREFERRED & ALTERNATIVE EMBODIMENTS

The present invention provides two-way communications access to a wide area network (WAN) for a very large number of users or subscribers who send information to and receive information from the network. The invention offers an inexpensive "last-mile" hookup to a very large number of subscribers. The system is particularly useful where there is not a high data-rate capable telecommunications infrastructure or it is very costly to install one. The installed base of conventional copper wires present inherent limitations and constraints to providing enhanced levels of communications services. Use of copper telephone wires to carry information signals is possible at low data rates, but at high data rates, these wires cannot carry information signals over much distance because of losses. New compression and signal processing techniques enable telephone companies to offer faster speeds and greater bandwidth using new services such as ISDN, DSL and ADSL. But because of the installation costs, these techniques cannot be used everywhere even in the developed countries. The market demand for more capacity will soon outpace these recent innovations. The use of optical fiber and cable television networks have their own drawbacks and are relatively expensive to install and to maintain. Low loss conductors such as coaxial cable or optical fibers are expensive in themselves, and the cost of stringing or burying these cables in order to bring them to an individual subscriber is usually prohibitively expensive, particularly in densely settled urban communities.

One Preferred Embodiment of the System

Figure 1:
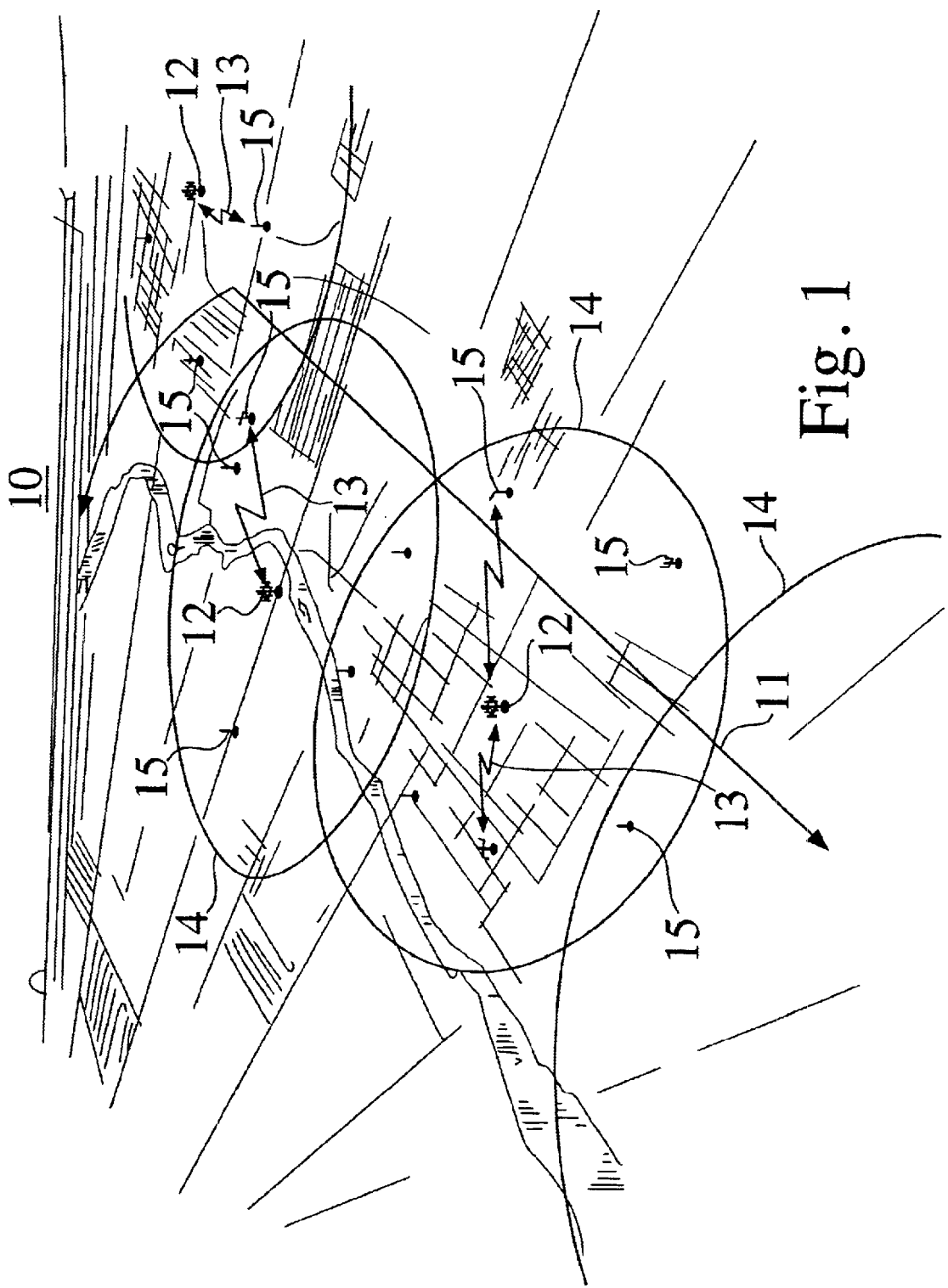
FIG. 1 is a perspective view of a portion of the Network Access Communication System serving urban and suburban communities, showing services areas, wide-area-network-access communication hubs and subscriber terminals.

FIG. 1 shows in perspective view a portion of the System 10 serving urban and suburban communities. Communications access to a WAN 11 is provided by creating a plurality of service areas 14 within which subscribers are located. Subscribers are connected to a subscriber terminal 15 either directly or through a local area network (LAN). The LAN may be operated by or through a local public switched telephone network (PSTN). In one embodiment, the interface to the LAN operates full duplex on the Ethernet™ 10BaseT standard. The subscriber terminals 15 are coupled to central communication hubs 12 by super high frequency (SHF) radio links 13. Typically, each communication hub 12 is roughly centered in the service area 14. The radio links 13 operate at frequencies in the microwave or millimeter wave bands. A preferred frequency band is 59–64 GHz, but other bands from 3 GHz to 300 GHz can be used. At these frequencies subscriber terminal antennas are very small, about six inches diameter or less. The communication hubs 12 are connected to a WAN 11 such as the Internet World Wide Web. The interface to the WAN 11 from the hub 12 completes a fully symmetric, ten megabits per second (10 Mbps) system 10 which transports information from a subscribers computer to general-purpose applications, such as web services business, and return. Such applications generate about equal amounts of upstream (outgoing) traffic and downstream (incoming) traffic.

Service Area

Figure 2:
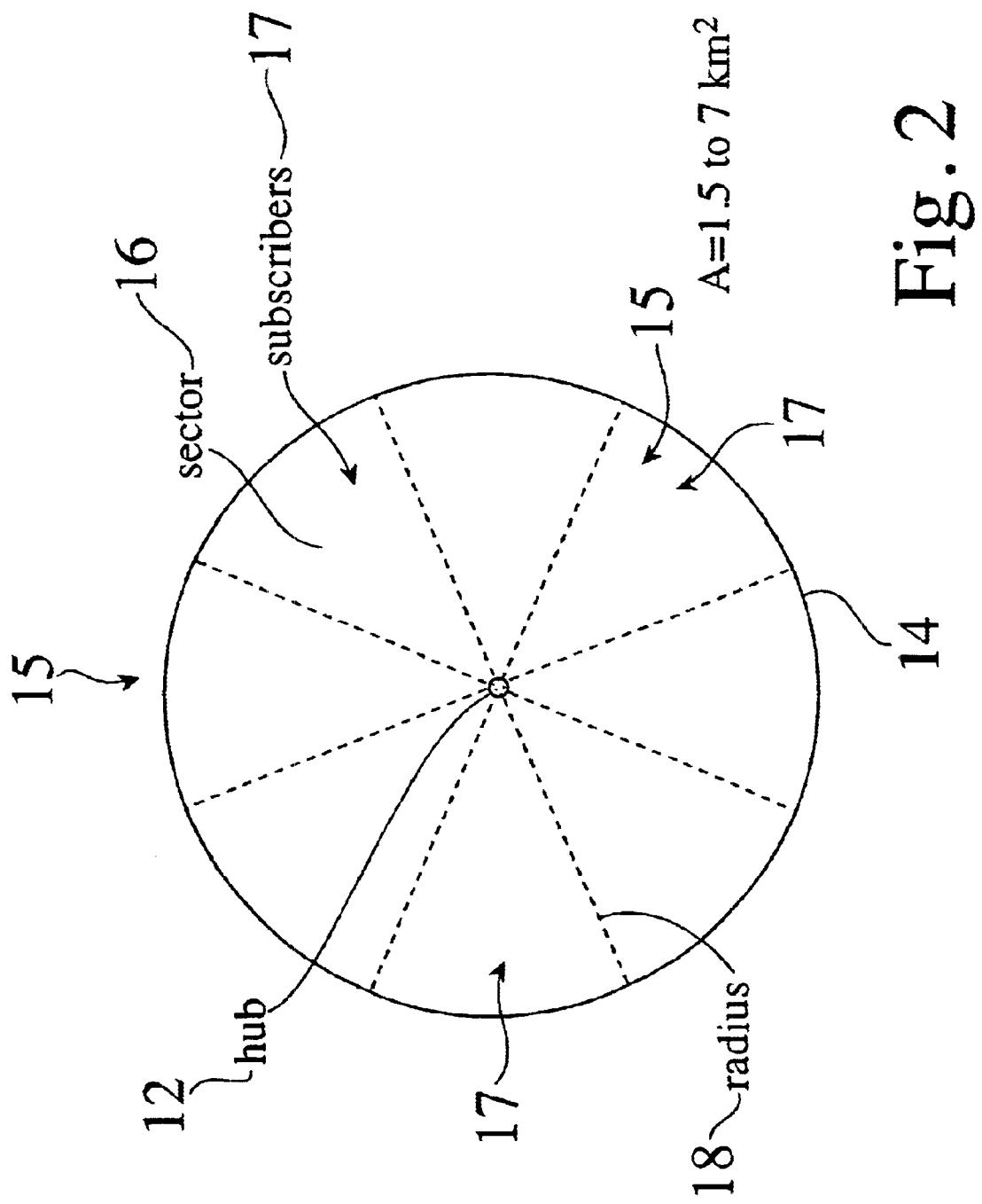
FIG. 2 is a plan view schematic diagram of a service area, containing a communications hub and subscriber terminals.

FIG. 2 is a plan view diagram of a service area 14. The service area 14 contains a wide-area-network-access, central communications hub 12 which is capable of two-way radio-frequency communications with the subscriber terminals 15. The service area 14 is divided into sectors 16, within which the subscribers 17 and subscriber terminals 15 are resident. The number of sectors may vary depending on the density of subscribers 17. A sector can support efficiently approximately 200 subscribers 17. One to forty sectors 16 per service area are preferred. One embodiment of the invention as shown in FIG. 2 has a service area 14 with eight sectors 16. An eight sector service area can therefore efficiently support approximately 1,600 subscribers. One or more subscribers generally will be connected to the LAN.

A service area 14 typically has a radius 18 of approximately 0.7 to 1.5 kilometers (km), yielding a coverage area of 1.5 to 7 km. These dimensions are selected to take advantage of low energy transmitters which do not require FCC licensing. Atmospheric oxygen absorption of the microwave or millimeter waves used for the radio links 13 is about 15 dB per kilometer. This absorption of signals is such that low-power, subscriber terminal transmitters, while not requiring licenses by the FCC, can operate successfully over a distance of one to two kilometers, the radius 18 of a service area 14.

Figure 3:
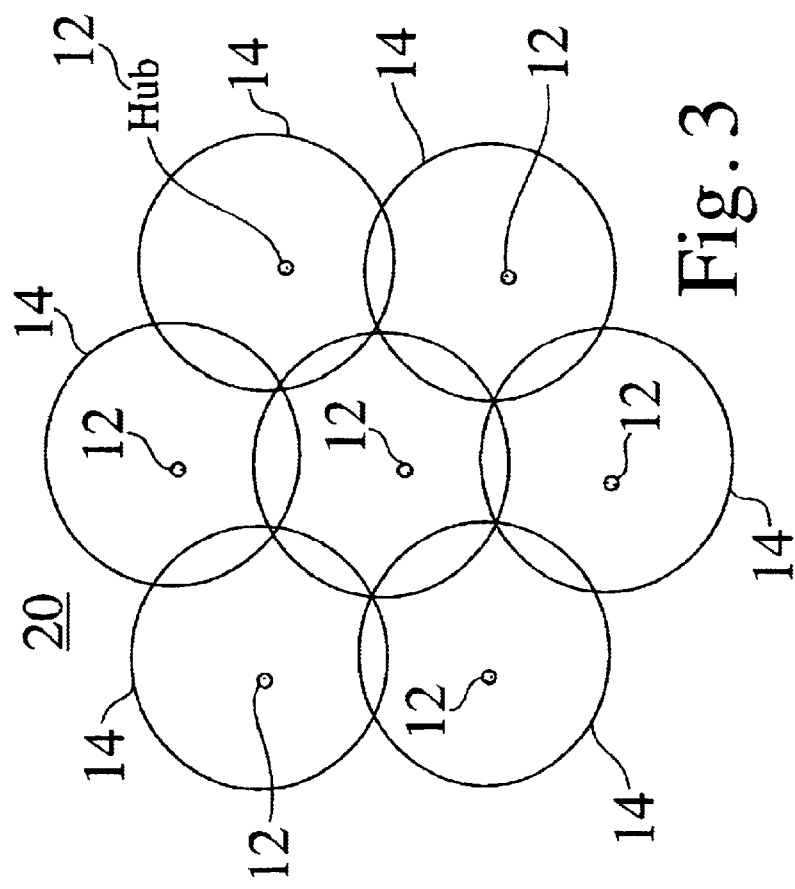
FIG. 3 is a schematic diagram showing a plurality of communication hubs, grouped and partially overlapped to provide a system of network access over large areas.

Service areas 14 may be abutted or overlapped to cover larger included areas. FIG. 3 is a schematic diagram showing a plurality of communications hubs 12 providing service areas 14 which are grouped and partially overlapped to provide a system 20 of wide area network access over large areas. Other arrangements are possible, including overlapping the service areas 14 so that individual subscribers 17 will be within line-of-sight of a communications hub 12.

Figure 4:
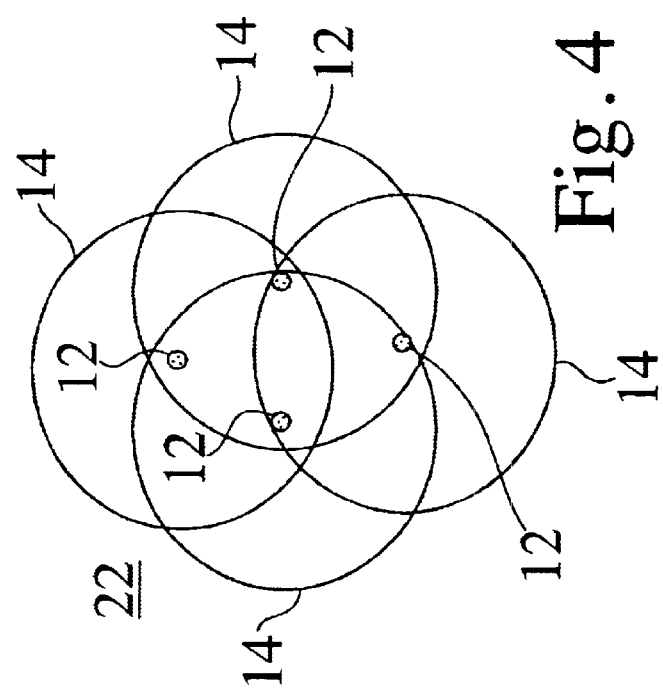
FIG. 4 is a schematic diagram of another system configuration having a plurality of communication hubs, grouped and partially overlapped to provide a large number of subscriber terminals with line-of-sight communications with a wide-area-network-access hub.

FIG. 4 is a schematic diagram of another system having a plurality of wide area network access communications hubs 12, grouped and partially overlapped to provide a large number of subscriber terminals 15 with line-of-sight communications with a hub 12. The arrangement of service areas 14 is readily adapted to the terrain, the existing structure (e.g., PSTN) and the number of subscribers 17 contemplated.

Distributed routing of the information signals, described below, provides subscribers 17 with low latency (no-waiting) symmetric transmission of information signals at speeds of about ten million bits per second (10 Mbps). The router functions are placed in part in the subscriber terminal 15 and in part in the communications hub 12. Availability of a communication path in this system approximates that of a fiber optic cable, from 99.7 to 99.9% of time. The system has a low bit error rate (approximately one bit in $10^{-8}$ bits) and a high frequency re-use factor. Among the information exchange protocols the system supports is the transmission control protocol, Internet protocol (TCP/IP) suite.

Communications Hub

FIG. 5 presents a schematic diagram of signal flow in a communications hub 12 to and from a plurality of subscriber terminals 15. In one embodiment the hub 12 is accessed by the subscriber terminals 15 through 60 GHz radio links 13. FIG. 5A is a functional block diagram of the communications hub 12 and a subscriber terminal 15. Each subscriber terminal 15 includes a transceiver 42 and a two-port router 44 connected by a serial interface 43. In one preferred embodiment, the subscribers 17 and the subscriber terminal 15 share a single LAN 39, for example, a 10BaseT Ethernet™. The router 44 is connected to the LAN 39 and then to the subscribers 17 by a 10BaseT interface. The router 44 is further detailed below. The router 44 serves as the subscribers gateway to his network provider and the WAN 11. There may be as few as one subscriber 17 connected to a subscriber terminal 15, but typically there will be as many as 200 or more.

The communications hub 12 includes a network unit (NU) 34 and a radio unit (RU) 32. The network unit 34 includes a multi-port router 34 having one or more WAN ports 36 and a plurality of 100BaseT ports 35. The WAN port 36 is typically T3 or OC3 standard. An off-the-shelf router such as manufactured by Cisco Systems may be used. The radio unit 32 includes a non-blocking multiplex/demultiplex (MUX/DEMUX) unit 37 and a multi-channel transceiver 40.

Packets of information are transported over the LAN from a subscriber 17 to a network service provider connected to the WAN 11. The MUX/DEMUX unit 37 receives and multiplexes subscriber traffic onto the 100BaseT ports 35. The traffic is aggregated and forwarded to the router 34 and output to the WAN port 36 for transmission to the network service provider. In one preferred embodiment, the network service provider is an Internet service provider (ISP). Redundancy is available through an alternate port. Return communications from the WAN 11 follow the reverse course. Packets received from the WAN 11 are sorted by sector 16 at the communications hub 12. All of the packets for each sector 16 are then transferred by radio link 13 to the appropriate subscriber terminal 15 in that sector 16. The subscriber terminal router 44 then sends the packets to subscribers 17 via the 10BaseT interface and LAN 39.

The hub antennas 41 are directional and configured to receive signals from each sector 16 on a separate frequency. In one embodiment, the 59 to 64 GHz radio frequency band is divided into twelve sub-bands of 416.7 MHz each. For communication hubs 12 with from one to twelve sectors 16, each sector 16 is assigned to a different frequency sub-band. For hubs 12 with from twelve to twenty four sectors 16, the sub-bands are used up to two times per hub. For hubs 12 with from 25 to 36 sectors 16, the sub-bands are used up to three times per hub 12, and for 37 to 48 sectors 16, they are used up to four times. Frequency reuse patterns for various numbers of sectors 16 are shown in Table 1 below. Frequency sub-band assignments (F1 ... Fn) are in the order of the sectors 16 around the communications hub 12:

TABLE 1

Frequency Channel Assignments in Service Area Sectors

| No. Of Sectors | Frequency Assignments (F1–Fn) by Sector |
|---|---|
| 12 | F1, F2, F3, F4, F5, F6, F7, F8, F9, F10, F11, F12 |
| 18 | F1, F2, F3, F4, F5, F6, F7, F8, F9, F1, F2, F3, F4, F5, F6, F10, F11, F12 |
| 24 | F1, F2, F3, F4, F5, F6, F7, F8, F9, F10, F11, F12, F1, F2, F3, F4, F5, F6, F7, F8, F9, F10, F11, F12 |
| 30 | F1, F2, F3, F4, F5, F6, F7, F8, F9, F10, F11, F12, F1, F2, F3, F4, F5, F6, F7, F8, F9, F10, F11, F12 |
| 36 | F1, F2, F3, F4, F5, F6, F7, F8, F9, F1, F2, F3, F4, F5, F6, F10, F11, F12, F1, F2, F3, F4, F5, F6, F7, F8, F9, F1, F2, F3, F4, F5, F6, F10, F11, F12 |
| 48 | F1, F2, F3, F4, F5, F6, F7, F8, F9, F10, F11, F12, F1, F2, F3, F4, F5, F6, F7, F8, F9, F10, F11, F12 F1, F2, F3, F4, F5, F6, F7, F8, F9, F10, F11, F12, F1, F2, F3, F4, F5, F6, F7, F8, F9, F10, F11, F12 |

System Management

Management of all of the elements of the Network Access Communication System 10 uses the standard SNMP protocol and a stand alone network management station. Alternatively, it can operate as a module in a network service provider's management station.

Communication Techniques

To avoid interference between subscribers 17 and to provide very high speed information transfer to the large number of users contemplated, the radio communication link 13 in one embodiment incorporates time division duplex (TDD), multi-frequency, time division multiple access (MF-TDMA), channel hopping, sixteen-frequency shift keying (16-FSK) modulation and concatenated coding features. Other alternatives to TDD include frequency division duplex (FDD), code division duplex (CDD) and polarization division duplex (PDD). Other usable multiple access techniques include time division (TDMA), frequency division (FDMA), code division (CDMA), polarization division (PDMA), multi-frequency CDMA, multi-frequency PDMA and combinations of these. Modulation techniques include frequency shift keying (FSK), M-ary FSK, where M=2,3, 4 . . . 100, or more and M-ary versions of phase shift keying (PSK). Other usable modulation techniques include M-ary versions of amplitude shift keying (ASK), quadrature amplitude modulation (QAM), pulse position modulation (PPM), Gaussian minimum shift keying (GMSK), continuous phase frequency shift keying (CPFSK), vestigial sideband (VSB) and continuous phase modulation. As before, M=2, 3, 4 . . . 100, or more. Alternative coding schemes include block codes, convolutional codes, turbo codes, turbo block codes and combinations thereof.

FIG. 6 presents a table of communication link budgets for a 60 GHz radio link 13 used for communications between the communications hub 12 and a subscriber terminal 15. High quality of service is achieved using less network bandwidth by employing Dynamic Bandwidth Allocation. The subscriber 17 can select the quality of service desired. The subscriber 17 can choose from a wide range of speed options from 1 to 10 megabits per second.

Distributed Routing

As described above, the routing function is distributed between the communications hub 12 and one or more subscriber terminals 15. One router 34 delivers the packets to and from the communications hub 12 and the WAN 11. Another router 44 delivers the packets to and from a LAN 39 to the appropriate connected subscriber 17. Local subscriber-to-subscriber intranet communication takes place over the LAN 39. A subscriber communication to the WAN 11 proceeds to the subscriber terminal 15. The signals then pass through the router 44, the transceiver 42 and the radio link 13 to the communications hub 12 where they are processed as described above. Other routed or switched LAN structures are possible. In the simplest case, a single subscriber 17 is connected directly to a subscriber terminal 10BaseT port. Individual residential subscribers 17 having a single personal computer are most likely to be connected this way.

Subscribers 17 are always "on" and do not require dial up to establish service or obtain a temporary network service provider address. A subscriber 17 is assigned a block of one or more unique network service provider IP addresses from the provider's own pool. Subscribers 17 can employ a proxy server to facilitate multiple user's sharing of a single network service provider address. In a different embodiment of the invention, the ISP will allocate IP addresses on demand only (dynamically) to conserve addresses.

Subscriber Terminal

FIG. 7 is a top level functional block diagram of a subscriber terminal 15. The RF block 56 contains the final transmitter stage and first receiver stage. In one embodiment, described below, these two stages comprise the same components, their function depending only on the switching of the signal path between components. The RF block 56 is coupled to an antenna 58 and to an intermediate frequency (IF) stage 54. The IF stage is further coupled to a digital signal processing (DSP) stage 52. In a preferred embodiment, the DSP stage 52 includes an application specific integrated circuit (ASIC) comprising a modem and a router 44. As described above, in one embodiment, one router port connects to the LAN 39 through a 10BaseT interface 59.

In FIG. 8 a more detailed functional block diagram 60 of a subscriber terminal 15 is presented. The principal components of the subscriber terminal 15 are an antenna 58, microwave integrated circuit (MIC) 76, intermediate frequency integrated circuit 68, digital signal processor 52 and LAN interface 59.

A signal received from radio link 13 through the antenna 58 is bandpass filtered by an RF filter 78 to remove out-of-band emissions. The RF filter output is applied to the microwave integrated circuit 76. There it is amplified by a low noise amplifier (LNA) to set the system noise figure. The LNA output is bandpass-filtered to reject the image and set the noise bandwidth. The filter output is then down-converted to an intermediate frequency (IF) using a mixer. The incoming RF signal is heterodyned in the mixer with multiple of a first local oscillator signal 74 supplied by the IF integrated circuit 68. The frequency multiplier is shown in the block diagram of FIG. 9 and described below. The mixer output is bandpass-filtered by a ceramic first IF filter 72 to reject spurious mixer frequencies. The filter 72 output is applied to the IF integrated circuit 68 where it is sampled and quantized. The IF integrated circuit is an application specific integrated circuit (ASIC) in a preferred embodiment. The receive samples 70a are further processed by the digital signal processing (DSP) ASIC 52 to recover the information to be delivered to the subscriber 17. This information is then delivered to the LAN 39 and thence to the subscriber 17 via a 10BaseT interface 59. Logic clock signals 70c and control signals 70d are passed between the IF ASIC 68 and the DSP ASIC 52.

Subscriber information to be transmitted to the WAN 11 is input to the DSP ASIC 52 through the 10BaseT interface 59. This information is processed by the DSP ASIC 52 to form the transmit samples 70b. The transmit samples 70b are then input to the IF integrated circuit 68. The IF integrated circuit 68 converts the transmit samples 70b into an IF signal. The IF signal is bandpass filtered to reject spurs and the output is applied to the MIC 76. The IF signal is upconverted in the MIC 76 using the frequency mixer. A preferred embodiment of the MIC 76 is shown in FIG. 13 and described below. The mixer output is amplified, filtered and then sent to the antenna 58 for transmission to the communications hub 12.

The MIC mixer local oscillator (LO) signal is obtained by repeatedly doubling the frequency of a first local oscillator sub-harmonic signal 74 originated by the IF ASIC crystal 64 and RC phase locked loop filter 62. FIG. 9 is a block diagram of a frequency multiplier 80 used to form the MIC local oscillator signal from the sub-harmonic frequency 74. The frequency multiplier 80 comprises alternate balanced, active doublers 82 and bandpass filters 84. The first LO sub-harmonic signal 74 is input to the frequency multiplier 80 and the emerging signal 88 is the LO signal provided to the MIC mixer.

FIG. 10 presents a schematic diagram 90 of one embodiment of a balanced, active doubler 82. A signal at the frequency of a prior stage $F_{IN}$ is fed to the doubler 82 through a quarter-wave microstrip 92 resonant at $F_{IN}$. That signal is applied to the gate of a first field-effect transistor (FET) 98. The signal is also applied, 180 degrees out of phase, to the gate of a second FET 98, connected in "push-push" with the first FET 98. Microstrip 94 accomplishes the phasing. The combined signal at the drain of the FET's 98 is passed through a microstrip 96, resonant at the frequency FOUT which is twice that of $F_{IN}$.

A portion of the subscriber terminal 15, operating at the intermediate frequency (IF) may be separated into an indoor unit (IDU) 104 and an outdoor unit (ODU) 102, connected by coaxial cable 106. FIG. 11 is a schematic diagram of this approach which would permit the combination of MIC transceiver 56 and antenna 58 in a small weatherproof package.

The application specific integrated circuit (ASIC) 52 used for digital processing of signals (DSP) which modulate and demodulate the signals on radio frequency link 13 is shown in FIG. 12 as a functional block diagram 110. A preferred embodiment combines the functions of the two-port router 44, modem 116, timing generator 126 and microprocessor 112 with its random access memory (RAM) 114 within the ASIC. The encoder 124 and modulator 122 prepare the outgoing transmit samples 130 from the subscribers' information signals received through the 10BaseT interface 59. The demodulator 118 and decoder 120 convert the receive samples 128 into information signals for the appropriate subscriber 17. As described earlier, the subscriber-destined signals are forwarded to the router 44 for distribution to the LAN 39.

In one embodiment of system, which operates in a time division duplex (TDD) mode, a novel radio-frequency module is used in the MIC 76. FIG. 13 is a schematic diagram 140 of this transmit/receive module 142. The transmit/receive module 142 acts in time division duplex operation as both a first receiver stage and a final transmitter stage for signals communicated both ways over the radio link 13. It acts as a receiver front end or a transmitter final stage depending only on the switching of the signal path between components. It implements a high-speed, symmetric-path, radio signal between a subscriber terminal 15 and a communication-hub 12 connection to the WAN 11. Switching times of about one millisecond permit flow of information in either direction over the SHF radio link 13 between subscriber terminal 15 and communications hub 12. The module 142 comprises an amplifier 156, a filter 154, a frequency mixer 152 and four switches 160a, b, c, d operated by a transmit/receive selector 158. The module 142 can be operated at any frequency band from direct current (dc) to light. In the instant invention, it is operated at SHF and preferably at about 60 GHz When switched in a first position as shown in FIG. 13, the module 142 operates as a receiver front end and performs a low-noise down-conversion from radio frequency (RF) to intermediate frequency (IF). When switched in a second position, opposite to that shown in FIG. 13, the module 142 operates as a transmitter final stage. It performs an up-conversion from IF to RF and a final amplification. The signal 146 from the antenna 58 is applied to the low noise amplifier/power amplifier 156. The signal 146 is amplified, filtered in the image rejection filter 154 and down-converted to IF in the mixer 152. The action of the local oscillator 150 signal derived from the first LO sub-harmonic signal 74 produced in the IF ASIC 68 has been described above. The received IF signal 144 is delivered to the IF ASIC 68 for processing.

The transmit/receive switches 160a, b, c, d and the selector 158 can be mechanical or electronic. Mechanical switches 160a, b, c, d, 158 include coaxial, waveguide, and micro-machined switches. Electronic switches include PIN diode and FET switches. These switches can be implemented using silicon, silicon-germanium, gallium-arsenide devices, or by devices using other semiconductor technologies. The switches 160a, b, c, d are moved from receiver to transmitter positions as the information stream alternates from incoming traffic to outgoing traffic. The time the module 142 is in transmit and receive positions may be of the same, different or variable duration. Typical switching times are one millisecond in each direction.

The low noise amplifier/power amplifier 156 is implemented by one of a number of semiconductor technologies, including silicon, silicon-germanium, gallium-arsenide and indium-phosphide. The filter 154 is implemented by waveguide, stripline, coaxial or microstrip methods. The mixer 152 can be active or passive and is implemented by the same semiconductor technologies as is the low noise/power amplifier 156.

CONCLUSION

Although the present invention has been described in detail with reference to particular preferred and alternative embodiments, persons possessing ordinary skill in the art to which this invention pertains will appreciate that various modifications and enhancements may be made without departing from the spirit and scope of the Claims that follow. The various hardware configurations that have been disclosed above are intended to educate the reader about preferred and alternative embodiments, and are not intended to constrain the limits of the invention or the scope of the Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

FIGS. 1–5A

10 Perspective view of a portion of the Network Access Communication System
11 Local Area Network (LAN)
12 Communications hub
13 Microwave/millimeter wave radio link
14 Service area
15 Subscriber terminal
16 Sector
17 Subscriber(s)
18 Service area radius
20 Plan view diagram of one system embodiment having overlapping service areas
22 Plan view diagram of an alternative system embodiment having greatly overlapped services areas providing line of sight transmission from subscriber terminals to communication hubs
30 Schematic diagram of a communications hub and subscriber terminal interfaces
32 Hub radio unit (RU)
34 Hub network unit (NU) multi-port router
35 100 BaseT interface
36 NU interface to a wide area network
37 Multiplex/demultiplex unit
38 Functional block diagram of communications hub and subscriber terminal
39 Local area network (LAN)
40 Transceiver/RF processor
41 Communications hub antenna
42 Transceiver/RF processor
44 Two-port router
58 Subscriber terminal antenna

FIGS. 7–8

39 LAN
46 Top level functional block diagram of a subscriber terminal
52 Digital signal processing, application-specific integrated circuit (modem and router)

54 Intermediate frequency (IF) stage
56 Final RF transmitter/first RF receiver stage
58 Subscriber terminal antenna
59 10BaseT interface between the subscriber terminal and LAN
60 Functional, detailed block diagram of a subscriber terminal
62 RC phase locked loop filter
64 First local oscillator crystal
66 Second IF filter
68 Intermediate frequency (IF) bipolar integrated circuit
70a Receive information samples
70b Transmit information samples
70c Logic clock signals
70d Control signals
72 First IF ceramic filter
74 First local oscillator sub-harmonic signal
76 Microwave integrated circuit (MIC) transmitter/receiver
78 RF filter

FIG. 9

74 Final local oscillator (LO) sub-harmonic signal
80 Block diagram of the frequency multiplier scheme
82 Balanced, active frequency doubler
84 Bandpass filter
88 LO signal to RF mixer

FIG. 10

82 Frequency doubler
90 Schematic diagram of a balanced, active frequency doubler
92 Input frequency, quarter-wave resonant microstrip
94 Input frequency, half-wave microstrip
96 Output frequency, quarter-wave resonant microstrip
98 Transistors connected in "push-push"
Fin Input frequency from first LO or prior stage
Fout Output frequency: input frequency×2

FIG. 11

100 Schematic diagram of the subscriber terminal indoor unit (IDU) and outdoor unit (ODU)
102 Outdoor unit
104 Indoor unit
106 interconnecting coaxial cable

FIG. 12

44 Router
52 Digital signal processing application-specific integrated circuit (ASIC)
59 10BaseT interface
70a Received information signals
70b Information signals to be transmitted
70c Logic clock signal
70d Control signals
110 Functional block diagram of application specific integrated circuit (ASIC)
112 Microchip processor
114 Random access memory
116 Modem
118 Demodulator
120 Decoder
122 Modulator
124 Encoder
126 Timing generator
134 Read only memory interface

FIG. 13

140 Schematic diagram of a transmit/receive module
142 Transmit/receive module
144 Signal to/from the intermediate frequency (IF) circuit
146 Radio frequency input/output to/from the antenna
148 First local oscillator signal
150 Frequency multiplier circuit
152 Mixer
154 Image rejection filter
156 Low noise amplifier/power amplifier
158 Transmit/receive switch
160a–d Switching contacts
162 Local oscillator frequency signal

What is claimed is:

1. A network communication system (10) comprising:

a communications hub (12) having a first router (34) and a hub radio unit (32); said first router (34) being coupled at a first end to said radio unit (32) by a plurality of ports (35) and being coupled at a second end to a plurality of network providers (ISP) in a wide area network (WAN)(11) by port (36);

a subscriber terminal (15) having a second router (44) and a radio frequency processing unit (42); said second router (44) being coupled at a first end by port (59) to subscribers (17) in a local area network (LAN)(39) and being coupled at a second end to said radio frequency processing unit (42);

said communications hub radio unit (32) and said subscriber terminal radio frequency processing unit (42) exchanging information as radio signals (13); and said information input by subscribers (17) to said LAN (39) and destined for service providers (ISP) coupled to said WAN (11) being routed by said first router (34) and said second router 44 as outbound traffic on said system (10) and said information input by said network service providers (ISP) to said WAN (11) and destined for said subscribers (17) being routed by said first router 34 and said second router (44) as inbound traffic on said system (10);

said communications hub (12) and said subscriber terminal (15) being disposed within a service area (14); said service area (14) having a radius of seven tenths kilometer to one and one-half kilometers; said communications hub (12) being centrally disposed within said service area (14);

said communications hub (12) and said subscriber terminal (15) being disposed within a service area (14);

said service area (14) including a plurality of sectors (16), preferably one to forty sectors (16); each one of said plurality of sectors (16) having a subscriber terminal (15); and said radio signals (13) are transmitted and received in the 59–64 GHz frequency band.

2. The network communication system as claimed in claim 1, further including a plurality of service areas (14) which cover a larger area; said plurality of service areas (14) capable of being overlapped such that each one of said plurality of subscribers (17) is within line-of-sight of at least one said communications hub (12).

3. The network communication system as claimed in claim 1, in which said subscriber terminal (15) further includes an application specific integrated circuit (ASIC) (52) for modulating and demodulating information signals and routing said information signals to and from an appropriate subscriber (17), an intermediate frequency stage, application-specific integrated circuit (ASIC)(54) for processing modulated information signals received (70a) and to be transmitted (70b), and a microwave integrated circuit (MIC)(56) for transmitting and receiving said radio signals (13).

4. The network communication system as claimed in claim 1, in which each one of said plurality of ports (35) operate to a 100BaseT standard.

5. The network communication system as claimed in claim 1, in which said port (36) is operable as a T3 and an OC3 standard.

6. The network communication system as claimed in claim 1, in which said LAN (39) is an Ethernet™ 10BaseT network.

7. The network communication system as claimed in claim 1, in which said communication hub (12) includes directional antennas (41), configured to communicate with each said sector (16) on a separate frequency.

8. The network communication system as claimed in claim 1, in which interference is avoided between subscribers 'signals by use of channel hopping; use of a duplex technique selected from a group consisting of time division duplex (TDD), frequency division duplex (FDD), code division duplex (CDD), and polarization division duplex (PDD); a multiple access technique selected from a group consisting of time division multiple access (TDMA), frequency division multiple access (FDMA), code division multiple access (CDMA), polarization division multiple access (PDMA) multi-frequency CDMA, multi-frequency PDMA, and combinations of these; a modulation technique selected from a group consisting of M-ary frequency shift keying (FSK), M-ary phase shift keying (PSK), M-ary amplitude shift keying (ASK), M-ary quadrature amplitude modulation (QAM), M-ary pulse position modulation (PPM), M-ary Gaussian minimum shift keying (GMSK), M-ary continuous phase frequency shift keying (CPFSK), M-ary vestigal sideband (VSB) and M-ary continuous phase modulation (CPM), where M=2, 3, to 100 and greater; and a coding technique selected from a group consisting of concatenated codes, block codes, convolutional codes, turbo codes, turbo block codes and combinations thereof.

9. The network communication system as claimed in claim 3, in which said microwave integrated circuit (56) includes a low-power. transmitter (76) not requiring Federal Communications Commission Licensing.

10. The network communication system as claimed in claim 3, in which said microwave integrated circuit (56) includes a transmit/receive module (142) comprising:
  a low-noise amplifier/power amplifier (156);
  an image rejection filter (154);
  a mixer (152); having as a first input a frequency (162) produced in a local oscillator (150);
  a transmit/receive selector (158) having a plurality of switching contacts (160a, b, c, d);
  said low-noise/power amplifier (156) being operated as a receiver front end when said transmit/receive selector (158) and said switching contacts (160a, b, c, d) are disposed in a first position and an incoming signal (146) from an antenna (58) is conducted through said low-noise/power amplifier (156) to said image rejection filter (154), then to said mixer (152) where it is heterodyned with said local oscillator frequency (162) to produce an intermediate frequency signal (144) for later demodulation; and
  said low-noise/power amplifier (156) being operated as a transmitter final stage when said transmit/receive selector (158) and said switching contacts (160a, b, c, d) are disposed in a second position and a modulated, intermediate frequency signal (144) is heterodyned with said local oscillator frequency (162) in said mixer (152) to produce a radio frequency signal which is conducted through said image rejection filter (154) and amplified in said low-noise/power amplifier (156) to produce a radio frequency signal (147) delivered to said antenna (58).

11. A network communication system comprising:
  a communications hub (12) having a hub radio unit (32); said communications hub (12) being coupled to a plurality of network service providers (ISP) in a wide area network (WAN)(11) through a first router (34); said first router having a plurality of 100BaseT interfaces with said hub radio unit (32) and T3 and OC3 interfaces with said WAN (11);
  a plurality of subscriber terminals (15), each of said plurality of subscriber terminals (15) having a radio frequency processor (42) and a second router (44); said plurality of subscriber terminals (15) being coupled to a plurality of subscribers (17) through said router (44) and a local area network (LAN)(39) operating at Ethernet™ 10BaseT standards;
    each one of said plurality of subscriber terminals (15) being located within a service area (14) and being reached by said communications hub (12) through a radio link (13) between said hub radio unit (32) and said radio frequency processor (42);
      said radio link (13) carrying information-modulated signals at microwave and millimeter wave frequencies;
  said plurality of subscriber terminals (15) delivering information input by said plurality of subscribers (17) on said LAN (39) to said communications hub (12) by said information-modulated radio signals (13) and thereafter routed to said plurality of network service providers (ISP) over said WAN (11) by said first router (34); and
  said communications hub (12) delivering information input by network service providers (ISP) to said WAN (11) and routed by said first router (34) to said radio unit (32), to said plurality of subscriber terminals (15) by said information-modulated radio signals (13); said subscriber terminals (15) thereafter delivering said information to said subscribers (17) over said LAN (39) by said second router (44).

12. A method of communication comprising the steps of:
  providing a communications hub (12) having a first router (34) and a hub radio unit (32);
    coupling said first router (34) at a first end to said radio unit (32) by a plurality of ports (35);
    coupling said first router (34) at a second end to network service providers (ISP) in a wide area network (WAN)(11) by a port (36);
  providing a subscriber terminal (15) having a second router (44) and a radio frequency processing unit (42);
    coupling said second router (44) at a first end to subscribers (17) in a local area network (LAN)(39) by port (59);
    coupling said second router (44) at a second end to said radio frequency processing unit (42);
  exchanging information as radio signals (13) between said communications hub radio unit (32) and said subscriber terminal radio frequency processing unit (42); and
  routing said information input by subscribers (17) to said LAN (39) and destined for service providers (ISP) coupled to said WAN (11) with said first with said second router (44) and then with said first router (35), and routing said information input by said network service providers (ISP) to said WAN (11) and destined for said subscribers (17) to the appropriate said sector (16) with said first router (34) and thereafter to the appropriate said subscriber(17) with said second router (44);

disposing said communications hub (12), said subscriber terminal (15) within a service area (14) having a radius of seven tenths kilometer to one and one-half kilometers; and centrally disposing said communications hub (12) within said service area (14);

dividing said service area into a plurality of sectors (16), preferably one to forty sectors (16); disposing a subscriber terminal (15) within each one of said plurality of sectors (16); and providing access to said system (10) for approximately 200 subscribers (17) in each of said plurality of sectors (16); and transmitting and receiving said radio signals (13) in the 59–64 GHz frequency band.

13. The method of communication claimed in claim 12, further including the steps of:

providing a plurality of service areas (14) which cover a larger area; and providing a plurality of service areas (14) capable of being overlapped such that said plurality of subscribers (17) are within line-of-sight of at least one said communications hub (12).

14. The method of communication as claimed in claim 12, in which the step of providing access to said system (10) for approximately 200 subscribers (17) in each of said plurality of sectors (16), includes the step of avoiding interference between subscribers' signals by using channel hopping; using a duplex technique selected from a group consisting of time division duplex (TDD), frequency division duplex (FDD), code division duplex (CDD), and polarization division duplex (PDD); using a multiple access technique selected from a group consisting of time division multiple access (TDMA), frequency division multiple access (FDMA), code division multiple access (CDMA), polarization division multiple access (PDMA) multi-frequency CDMA, multi-frequency PDMA, and combinations of these; using a modulation technique selected from a group consisting of M-ary frequency shift keying (FSK), M-ary phase shift keying (PSK), M-ary amplitude shift keying (ASK), M-ary quadrature amplitude modulation (QAM), M-ary pulse position modulation (PPM), M-ary Faussian minimum shift keying (GMSK), M-ary continuous phase frequency shift keying (CPFSK), M-ary vestigal sideband (VSB) and M-ary continuous phase modulation (CPM), where M=2,3, to 100 and greater; and using a coding technique selected from a group consisting of concatenated codes, block codes, convolutional codes, turbo codes, turbo block codes and combinations thereof.

15. The method of communication claimed in claim 13, further including the steps of:

within said subscriber terminal (15), modulating and demodulating information signals and routing said information signals to and from an appropriate subscriber (17) with an application specific integrated circuit (52);

processing modulated information signals received (70a) and to be transmitted (70b) with an intermediate frequency stage, application-specific integrated circuit (54); and transmitting and receiving said radio signals (13) with a microwave integrated circuit (56).

16. The method of communication as claimed in claim 13, in which the steps of:

coupling said first router (34) at a first end to said radio unit (32) by a plurality of ports (35) includes the step of coupling said plurality of ports (35) which operate to a 100BaseT standard to said radio unit (32); and coupling said first router (34) at a second end to network service providers (ISP) in a wide area network (WAN) (11) by port (36) includes the step of coupling said port (36) which is operable to a T3 and an OC3 standard to said WAN (11).

17. The method of communication as claimed in claim 12, in which the steps of providing said communication hub (12) and dividing said service areas (14) into a plurality of sectors (16) include providing said communications hub (12) with directional antennas (41), configured to communicate with each said sector (16) on a separate frequency.

18. The method of communication as claimed in claim 13, in which the step of providing approximately 200 subscribers (17) in each of said plurality of sectors (16) with access to said system (10) includes the step of providing said subscribers (17) access to said LAN (39) which is an Ethernet™ 10BaseT network.

19. The method of communication as claimed in claim 15, in which the step of transmitting and receiving said radio signals (13) with a microwave integrated circuit (56), includes the step of transmitting said radio signals with a low-power transmitter (76) not requiring Federal Communications Commission Licensing.

20. A network communication system (10) comprising:

communications hub means (12) for collecting and routing information signals passing between a plurality of subscriber terminals (15) and a plurality of network service providers (ISP); said communication hub means (12) coupled to said network service providers through a wide area network (WAN)(11);

subscriber terminal means (15) for collecting information from said plurality of subscribers (17) and converting said information into information signals which are then communicated by radio link (13) to said communications hub means (12); said subscriber terminal means (15) coupled to said subscribers (17) through a local area network (LAN)(39);

said communication hub means (12) and said subscriber terminal means (15) acting as gateways for a stream of information signals passing in both inbound and outbound directions between said subscribers (17) and said network service providers (ISP);

said information signals passing between said subscribers (17) and said subscriber terminal means (15) on said LAN (39); and said information signals passing between said communication hub means (12) and said network service providers (ISP) on said WAN (11).

21. The communications system claimed in claim 20, in which:

said communication hub means (12) includes a first router means (34) for routing information signals and a hub radio unit means (32) for receiving and transmitting said information signals; said first router means (34) being coupled at a first end to said radio unit means (32) by a plurality of ports (35) and being coupled at a second end to a plurality of network service providers (ISP) in a wide area network (WAN)(11) by port (36); and said subscriber terminal means (15) having a radio frequency processing unit means (42) for communicating with said communications hub (12) and second router means (44) for routing information signals between said subscribers (17) and said radio frequency processing unit means (42); said second router means (44) being coupled at a first end to subscribers (17) through said (LAN) (39) by port (59) and being coupled at a second end to said radio frequency processing unit means (42);

said communications hub radio unit means (32) and said subscriber terminal radio frequency processing unit means (42) exchanging said information signals as radio signals (13) in a super high frequency (SHF) band; and said information signals input by subscribers (17) to said LAN (39) and destined for service providers (ISP) coupled to said WAN (11) being routed by said first router (34) as outbound traffic on said system (10) and said information signals input by said network service providers (ISP) to said WAN (11) and destined for said subscribers (17) being routed by said second router (44) as inbound traffic on said system (10).

22. The communication system as claimed in claim 21, in which said communications hub (12) and said subscriber terminal (15) are disposed within a service area (14); said service area (14) having a radius of seven tenths kilometer to one and one-half kilometers; said communications hub (12) being centrally disposed within said service area (14).

23. The communication system as claimed in claim 22, in which said service area (14) further includes a plurality of sectors (16), preferably one to forty sectors (16); each one of said plurality of sectors (16) having a subscriber terminal (15); each of said plurality of sectors (16) supporting approximately 200 subscribers (17).

24. The communication system as claimed in claim 23, in which said SHF radio signals (13) are transmitted and received in the microwave and millimeter wave bands, preferably the 59–64 GHz frequency band.

25. The communication system as claimed in claim 23, further including a plurality of service areas (14) which cover a larger area; said plurality of service areas (14) capable of being overlapped such that said plurality of subscribers (17) are within line-of-sight of at least one said communications hub (12).

26. The communication system as claimed in claim 23, in which said subscriber terminal means (15) further includes:

digital signal processing means (52) for modulating and demodulating information signals and routing said information signals to and from an appropriate subscriber (17);

intermediate frequency stage means (54) for processing modulated information signals received (70a) and to be transmitted (70b); and transceiver means (56) for transmitting and receiving said radio signals (13).

27. The communication system as claimed in claim 23, in which said communication hub means (12) includes a plurality of directional antennas (41), configured to communicate with each said sector (16) on a separate frequency.

28. The communication system as claimed in claim 24, in which said plurality of ports (35) operate to a 100BaseT standard.

29. The communication system as claimed in claim 24, in which said port (36) is operable as a T3 and an OC3 standard.

30. The communication system as claimed in claim 24, in which said LAN (39) is an Ethernet™, 10BaseT network.

31. The communication system as claimed in claim 24, in which interference is avoided between subscribers signals by use of channel hopping; use of a duplex technique selected from a group consisting of time division duplex (TDD), frequency division duplex (FDD), code division duplex (CDD), and polarization division duplex (PDD); a multiple access technique selected from a group consisting of time division multiple access (TDMA), frequency division multiple access (FDMA), code division multiple access (CDMA), polarization division multiple access (PDMA) multi-frequency CDMA, multi-frequency PDMA, and combinations of these; a modulation technique selected from a group consisting of M-ary frequency shift keying (FSK), M-ary phase shift keying (PSK), M-ary amplitude shift keying (ASK), M-ary quadrature amplitude modulation (QAM), M-ary pulse position modulation (PPM), M-ary Gaussian minimum shift keying (GMSK), M-ary continuous phase frequency shift keying (CPFSK), M-ary vestigal sideband (VSB) and M-ary continuous phase modulation (CPM), where M=2,3, to 100 and greater; and a coding technique selected from a group consisting of concatenated codes, block codes, convolutional codes, turbo codes, turbo block codes and combinations thereof.

32. The communication system as claimed in claim 26, in which said transceiver means (56) includes a low-power transmitter (76) not requiring Federal Communications Commission Licensing.

33. The communication system as claimed in claim 26, in which said transceiver means (56) further includes:

a low-noise amplifier/power amplifier (156); image rejection means (154) for filtering a radio frequency signal (146, 147) to be transmitted or received;

a mixer (152); having as a first input a frequency (162) produced in a local oscillator (150);

transmit/receive selector means (158) for switching a plurality of switching contacts (160a, b, c, d);

said low-noise/power amplifier (156) being operated as a receiver front end when said transmit/receive selector means (158) and said switching contacts (160a, b, c, d) are disposed in a first position and an incoming radio frequency signal (146) from an antenna (58) is conducted through said low-noise/power amplifier (156) to said image rejection means (154), then to said mixer (152) where it is heterodyned with said local oscillator frequency (162) to produce an intermediate frequency signal (144) for later demodulation; and said low-noise/power amplifier (156) being operated as a transmitter final stage when said transmit/receive selector means (158) and said switching contacts (160a, b, c, d) are disposed in a second position and a modulated intermediate frequency signal (144) is heterodyned with said local oscillator frequency (162) in said mixer (152) to produce a radio frequency signal which is conducted through said image rejection means (154) and amplified in said low-noise/power amplifier (156) to produce a radio frequency signal (147) delivered to said antenna (58).

34. A network communication system (10) comprising:

a communications hub (12) having a first router (34) and a hub radio unit (32); said first router (34) being coupled at a first end to said radio unit (32) by a plurality of ports (35) and being coupled at a second end to a plurality of network providers (ISP) in a wide area network (WAN)(11) by port (36);

a subscriber terminal (15) having a second router (44) and a radio frequency processing unit (42); said second router (44) being coupled at a first end by port (59) to subscribers (17) in a local area network (LAN)(39) and being coupled at a second end to said radio frequency processing unit (42);

said communications hub radio unit (32) and said subscriber terminal radio frequency processing unit (42) exchanging information as radio signals (13); and said information input by subscribers (17) to said LAN (39) and destined for service providers (ISP) coupled to said WAN (11) being routed by said first router (34) and said second router 44 as outbound traffic on said system (10) and said information input by said network service providers (ISP) to said WAN (11) and destined for said subscribers (17) being routed by said first router 34 and said second router (44) as inbound traffic on said system (10);

said communications hub (12) and said subscriber terminal (15) being disposed within a service area (14); said service area (14) having a radius of seven tenths kilometer to one and one-half kilometers; said communications hub (12) being centrally disposed within said service area (14);

said communications hub (12) and said subscriber terminal (15) being disposed within a service area (14);

said service area (14) including a plurality of sectors (16) between one to forty sectors (16); each one of said plurality of sectors (16) having a subscriber terminal (15);

said radio signals (13) are transmitted and received in the 59–64 GHz frequency band;

a plurality of service areas (14) which cover a larger area; said plurality of service areas (14) capable of being overlapped such that each one of said plurality of subscribers (17) is within line-of-sight of at least one said communications hub (12); and said communication hub (12) including directional antennas (41), configured to communicate with each said sector (16) on a separate frequency; and a microwave integrated circuit (MIC)(56) for transmitting and receiving said radio signals (13);

said microwave integrated circuit (56) including a low-power transmitter (76) not requiring Federal Communications Commission Licensing.

35. A method of communication comprising the steps of:

providing a communications hub (12) having a first router (34) and a hub radio unit (32);

coupling said first router (34) at a first end to said radio unit (32) by a plurality of ports (35);

coupling said first router (34) at a second end to network service providers (ISP) in a wide area network (WAN)(11) by a port (36);

providing a subscriber terminal (15) having a second router (44) and a radio frequency processing unit (42);

coupling said second router (44) at a first end to subscribers (17) in a local area network (LAN)(39) by port (59);

coupling said second router (44) at a second end to said radio frequency processing unit (42);

exchanging information as radio signals (13) between said communications hub radio unit (32) and said subscriber terminal radio frequency processing unit (42); and routing said information input by subscribers (17) to said LAN (39) and destined for service providers (ISP) coupled to said WAN (11) with said first with said second router (44) and then with said first router (35), and routing said information input by said network service providers (ISP) to said WAN (11) and destined for said subscribers (17) to the appropriate said sector (16) with said first router (34) and thereafter to the appropriate said subscriber(17) with said second router (44);

disposing said communications hub (12), said subscriber terminal (15) within a service area (14) having a radius of seven tenths kilometer to one and one-half kilometers; and centrally disposing said communications hub (12) within said service area (14);

dividing said service area into a plurality of sectors (16), preferably one to forty sectors (16); disposing a subscriber terminal (15) within each one of said plurality of sectors (16);

providing access to said system (10) for approximately 200 subscribers (17) in each of said plurality of sectors (16); and transmitting and receiving said radio signals (13) in the 59–64 GHz frequency band;

providing a plurality of service areas (14) which cover a larger area;

providing a plurality of service areas (14) capable of being overlapped such that said plurality of subscribers (17) are within line-of-sight of at least one said communications hub (12);

dividing said service areas (14) into a plurality of sectors (16) include providing said communications hub (12) with directional antennas (41), configured to communicate with each said sector (16) on a separate frequency; and transmitting and receiving said radio signals (13) with a microwave integrated circuit (56), includes the step of transmitting said radio signals with a low-power transmitter (76) not requiring Federal Communications Commission Licensing.

* * * * *